(12) United States Patent
Milstein et al.

(10) Patent No.: US 8,280,015 B2
(45) Date of Patent: Oct. 2, 2012

(54) PROVIDING CONTEXTUAL INFORMATION WITH A VOICEMAIL MESSAGE

(75) Inventors: David Milstein, Redmond, WA (US);
David A Howell, Seattle, WA (US);
Linda Criddle, Kirkland, WA (US);
Philip A Chou, Bellevue, WA (US);
Timothy M Moore, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1603 days.

(21) Appl. No.: 11/398,816

(22) Filed: Apr. 6, 2006

(65) Prior Publication Data

US 2007/0237130 A1    Oct. 11, 2007

(51) Int. Cl.
*H04M 1/64* (2006.01)
(52) U.S. Cl. ............................... 379/88.23; 379/201.02
(58) Field of Classification Search .............. 379/67.1, 379/68, 88.12, 88.16, 88.19, 88.2, 88.21, 379/88.22, 88.23, 142.04
See application file for complete search history.

(56) References Cited

U.S. PATENT DOCUMENTS

| | | | | |
|---|---|---|---|---|
| 5,956,681 | A | 9/1999 | Yamakita | 704/260 |
| 6,069,940 | A * | 5/2000 | Carleton et al. | 379/88.04 |
| 6,249,765 | B1 * | 6/2001 | Adler et al. | 704/500 |
| 6,405,033 | B1 | 6/2002 | Kennedy et al. | 455/414.1 |
| 6,418,216 | B1 | 7/2002 | Harrison et al. | 379/208.01 |
| 6,442,250 | B1 | 8/2002 | Troen-Krasnow et al. | 379/93.15 |
| 6,678,357 | B2 | 1/2004 | Stumer et al. | 379/45 |
| 6,728,358 | B2 | 4/2004 | Kwan | 379/202.01 |
| 6,771,742 | B2 | 8/2004 | McCalmont et al. | 379/45 |
| 6,868,143 | B1 * | 3/2005 | Menon et al. | 379/88.13 |
| 6,904,132 | B2 | 6/2005 | Reynolds | 379/88.16 |
| 6,925,487 | B2 | 8/2005 | Kim | 709/203 |
| 7,027,654 | B1 | 4/2006 | James et al. | 382/236 |
| 7,180,997 | B2 | 2/2007 | Knappe | 379/387.01 |
| 7,251,313 | B1 * | 7/2007 | Miller et al. | 379/88.01 |
| 7,359,493 | B1 | 4/2008 | Wang et al. | 379/88.23 |
| 7,469,041 | B2 | 12/2008 | Cragun | 379/92.01 |
| 7,627,305 | B2 | 12/2009 | Helferich | |
| 7,697,511 | B2 | 4/2010 | Milstein et al. | 370/352 |
| 2002/0062310 | A1 | 5/2002 | Marmor et al. | 707/3 |
| 2002/0110226 | A1 * | 8/2002 | Kovales et al. | 379/88.17 |
| 2002/0124057 | A1 | 9/2002 | Besprosvan | 709/219 |

(Continued)

FOREIGN PATENT DOCUMENTS

EP    1 643 740    4/2006

OTHER PUBLICATIONS

Office Action mailed Jan. 21, 2010, in U.S. Appl. No. 11/444,633.

(Continued)

*Primary Examiner* — Olisa Anwah
(74) *Attorney, Agent, or Firm* — Merchant & Gould

(57) ABSTRACT

Aspects of the present invention are directed at obtaining contextual information with a voicemail message. In accordance with one embodiment, a method is provided that obtains additional contextual information that is not obtained automatically when a voicemail message is received. More specifically, the method includes automatically obtaining a first set of contextual information from a client associated with the caller when the caller is transferred to a voicemail system. Then a determination is made regarding whether the callee requests that additional contextual information be obtained. If the callee requests that additional contextual information be obtained, the requested information is obtained from a third-party service or by prompting the caller.

18 Claims, 18 Drawing Sheets

U.S. PATENT DOCUMENTS

| | | | |
|---|---|---|---|
| 2002/0196910 A1 | 12/2002 | Horvath et al. | 379/88.01 |
| 2003/0143974 A1 | 7/2003 | Navarro | 455/404 |
| 2003/0162557 A1 | 8/2003 | Shida | 455/521 |
| 2005/0003797 A1 | 1/2005 | Baldwin | 455/404.1 |
| 2005/0037739 A1* | 2/2005 | Zhong | 455/413 |
| 2005/0062844 A1 | 3/2005 | Ferren et al. | 348/14.08 |
| 2005/0090225 A1 | 4/2005 | Muehleisen et al. | 455/404.1 |
| 2005/0162267 A1 | 7/2005 | Khandelwal et al. | 340/506 |
| 2005/0164681 A1 | 7/2005 | Jenkins et al. | 455/412.1 |
| 2005/0176451 A1 | 8/2005 | Helferich | |
| 2005/0198143 A1 | 9/2005 | Moody et al. | 709/206 |
| 2005/0213565 A1 | 9/2005 | Barclay et al. | 370/352 |
| 2005/0213716 A1 | 9/2005 | Zhu et al. | 379/45 |
| 2005/0281284 A1 | 12/2005 | Shim et al. | 370/465 |
| 2006/0018305 A1 | 1/2006 | Cope | 370/352 |
| 2006/0059495 A1 | 3/2006 | Spector | 719/310 |
| 2006/0067308 A1 | 3/2006 | Cho | 370/352 |
| 2006/0072547 A1 | 4/2006 | Florkey et al. | 370/352 |
| 2006/0229093 A1 | 10/2006 | Bhutiani et al. | 455/518 |
| 2007/0115923 A1 | 5/2007 | Denny et al. | 370/352 |
| 2007/0127633 A1 | 6/2007 | Hertel et al. | 379/67.1 |
| 2007/0195735 A1 | 8/2007 | Rosen et al. | 370/335 |
| 2007/0201376 A1 | 8/2007 | Marshall-Wilson | 370/252 |
| 2007/0230443 A1 | 10/2007 | Milstein et al. | 370/352 |
| 2007/0237138 A1 | 10/2007 | Milstein et al. | 370/389 |
| 2007/0280433 A1 | 12/2007 | Milstein et al. | 379/67.1 |
| 2008/0003941 A1 | 1/2008 | Milstein et al. | 455/3.01 |
| 2008/0037723 A1 | 2/2008 | Milstein et al. | 379/88.12 |
| 2008/0069006 A1 | 3/2008 | Walter et al. | 370/252 |
| 2009/0100009 A1 | 4/2009 | Karp | 707/3 |
| 2009/0180596 A1 | 7/2009 | Reynolds et al. | 379/48 |

OTHER PUBLICATIONS

Office Action mailed Apr. 4, 2008, in U.S. Appl. No. 11/398,966.
Office Action mailed Nov. 12, 2008, in U.S. Appl. No. 11/398,966.
Office Action mailed Jul. 2, 2010, in U.S. Appl. No. 11/444,633.
Office Action mailed Jul. 21, 2010, in U.S. Appl. No. 11/397,475.
Office Action mailed Jul. 12, 2010, in U.S. Appl. No. 11/480,660; 18 pgs.
Office Action mailed Sep. 15, 2010, in U.S. Appl. No. 11/480,752.
Lookabaugh, T., et al.; "A Model for Emergency Service of VoIP Through Certification and Labeling," Federal Communications Law Journal 58(1):115-167, 2006.
Mintz-Habib, M., et al., "A VoIP Emergency Services Architecture and Prototype," Proceedings of IEEE In't Conference on Computer Communications and Networks, San Diego, CA, Oct. 17-19, 2005, pp. 523-528.
TCN Users' Manual [online], uploaded on Oct. 5, 2004; http://www.scmaonline.net/test/Linnie%20Files/Users'%20Manual.TCN.doc, retrieved Apr. 18, 2006.
Office Action mailed Feb. 2, 2011, in U.S. Appl. No. 11/397,475.
Office Action mailed Feb. 11, 2011, in U.S. Appl. No. 11/480,660.
Office Action mailed Feb. 18, 2011, in U.S. Appl. No. 11/480,752.
Office Action mailed Oct. 12, 2011, in U.S. Appl. No. 11/480,752.
Office Action mailed Mar. 28, 2012, in U.S. Appl. No. 11/480,752.
Office Action mailed Apr. 23, 2012, in U.S. Appl. No. 11/444,633.

* cited by examiner

PROVIDING CONTEXTUAL INFORMATION WITH A VOICEMAIL MESSAGE

BACKGROUND

Generally described, an Internet telephony system provides an opportunity for users to have a call connection with enhanced calling features compared to a conventional telephony system. In a typical Internet telephony system, often referred to as Voice over Internet Protocol (VoIP), audio information is processed into a sequence of data blocks, called packets, for communications utilizing an Internet Protocol (IP) data network. During a VoIP call conversation, the voice is converted into small frames of voice data according to a network layer protocol used in the IP data network and a voice data packet is assembled by adding an IP header to the frame of voice data that is transmitted and received.

VoIP technology has been favored because of its flexibility and portability of communications, ability to establish and control multimedia communication, and the like. VoIP technology will likely continue to gain favor because of its ability to provide enhanced calling features and advanced services. However, as enhanced calling features and advanced services grow in popularity and complexity, the amount of contextual information to be transmitted in order to provide such features and services becomes excessively large. With regard specifically to enhanced calling features and advanced services, current VoIP approaches can become inefficient for transferring large amounts of contextual information and not flexible in expanding data structures.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Aspects of the present invention are directed at obtaining contextual information with a voicemail message. In accordance with one embodiment, a method is provided that includes obtaining a first set of contextual information from the client associated with the caller. Then a determination is made regarding whether the voicemail account is configured to obtain additional contextual information. If the voicemail account is configured to obtain additional contextual information, the method obtains the additional contextual information from the caller. As a result, when a callee accesses a voicemail account, contextual information that, for example, describes the subject matter of the voice mail message may be provided.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present invention is directed at providing a user with access to contextual data that is related to a voicemail message. More specifically, the present invention obtains contextual information such as the "subject" of the voicemail message by prompting a caller for the information. When a callee accesses his or her voicemail messages, the contextual information obtained from the caller may be provided without the callee being required to listen to the body of the voicemail message. Although the present invention will be described in connection with an IP telephony environment, it is equally applicable to any type of digital data exchange that includes audio. Accordingly, the disclosed embodiments and examples are illustrative in nature and should not be construed as limiting.

Figure 1:
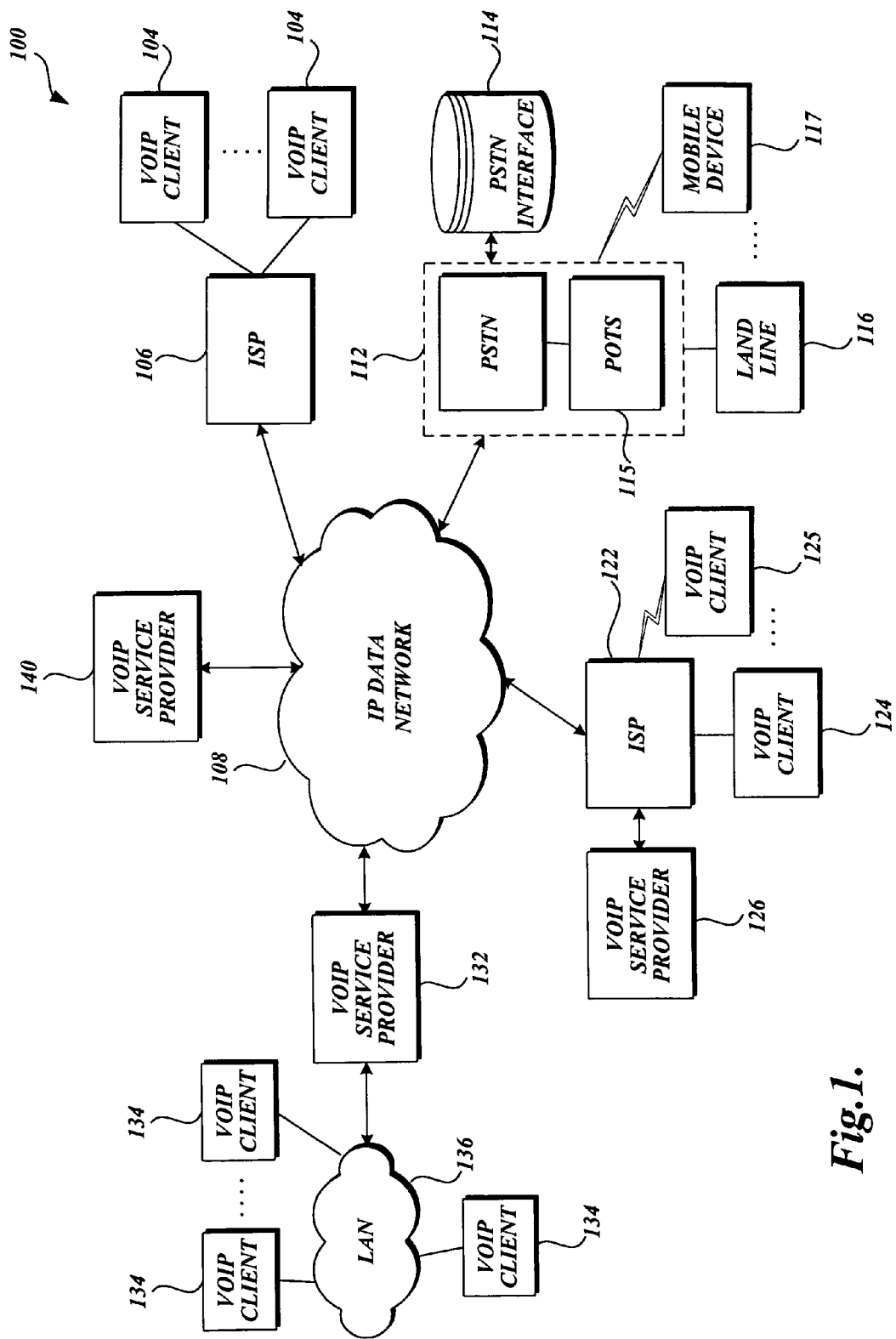
FIG. 1 is a block diagram illustrative of a VoIP environment for establishing a conversation channel between various clients in accordance with an aspect of the present invention.

With reference to FIG. 1, a block diagram of an IP telephony environment 100 for providing IP telephone services between various "VoIP clients" is shown. A "VoIP client," as used herein, refers to a particular contact point, such as an individual, an organization, a company, etc., one or more associated VoIP devices, and a unique VoIP client identifier. For example, a single individual, five associated VoIP devices and a unique VoIP client identifier collectively make up a VoIP client. Similarly, a company including five hundred individuals and over one thousand associated VoIP devices may also be collectively referred to as a VoIP client and that VoIP client may be identified by a unique VoIP client identifier. Moreover, VoIP devices may be associated with multiple VoIP clients. For example, a computer (a VoIP device) located in a residence in which three different individuals live, each individual associated with separate VoIP clients, may be associated with each of the three VoIP clients. Regardless of the combination of devices, the unique VoIP client identifier may be used within a voice system to reach the contact point of the VoIP client.

Generally described, the IP telephony environment 100 may include an IP data network 108 such as the Internet, an intranet network, a wide area network (WAN), a local area network (LAN) and the like. The IP telephony environment 100 may further include VoIP service providers 126, 132 providing VoIP services to VoIP clients 124, 125, 134. A VoIP call conversation may be exchanged as a stream of data packets corresponding to voice information, media information, and/or contextual information. As will be discussed in greater detail below, the contextual information includes metadata (information of information) relating to the VoIP conversation, the devices being used in the conversation, the contact point of the connected VoIP clients, and/or individuals that are identified by the contact point (e.g., employees of a company).

The IP telephony environment 100 may also include third-party VoIP service providers 140. The VoIP service providers 126, 132, 140 may provide various calling features, such as incoming call-filtering, text data, voice and media data integration, and the integrated data transmission as part of a VoIP call conversation. VoIP clients 104, 124, 125, 136 may create, maintain, and provide information relating to predetermined priorities for incoming calls. In addition, the VoIP service providers 126, 132, 140 may also generate, maintain, and provide a separated set of priority information (e.g., provider priority list) for individuals communicating in a call conversation. The VoIP service providers 126, 132, 140 may determined and assign an appropriate priority level to data packets based on priority information provided by VoIP clients 104, 124, 125, 136 in conjunction with the provider priority list.

VoIP service providers 132 may be coupled to a private network such as a company LAN 136, providing IP telephone services (e.g., internal calls within the private network, external calls outside of the private network, and the like), and multimedia data services to several VoIP clients 134 communicatively connected to the company LAN 136. Similarly, VoIP service providers, such as VoIP service provider 126, may be coupled to Internet Service Provider (ISP) 122, providing IP telephone services and VoIP services for clients of the ISP 122.

In one embodiment, one or more ISPs 106, 122 may be configured to provide Internet access to VoIP clients 104, 124, 125 so that the VoIP clients 104, 124, 125 can maintain conversation channels established over the Internet. The VoIP clients 104, 124, 125 connected to the ISP 106, 122 may use wired and/or wireless communication lines. Further, each VoIP client 104, 124, 125, 134 can communicate with Plain Old Telephone Service (POTS) 115 communicatively connected to a PSTN 112. A PSTN interface 114 such as a PSTN gateway may provide access between PSTN and the IP data network 108. The PSTN interface 114 may translate VoIP data packets into circuit switched voice traffic for PSTN and vice versa. The PSTN 112 may include a land line device 116, a mobile device 117, and the like.

Conventional voice devices, such as land line 116 may request a connection with the VoIP client based on the unique VoIP identifier of that client and the appropriate VoIP device associated with the VoIP client, will be used to establish a connection. In one example, an individual associated with the VoIP client may specify which devices are to be used in connecting a call based on a variety of conditions (e.g., connection based on the calling party, the time of day, etc.).

It is understood that the above mentioned configuration in the environment 100 is merely exemplary. It will be appreciated by one of ordinary skill in the art that any suitable configurations with various VoIP entities can be part of the environment 100. For example, VoIP clients 134 coupled to LAN 136 may be able to communicate with other VoIP clients 104, 124, 125, 134 with or without VoIP service providers 132 or ISP 106, 122. Further, an ISP 106, 122 can also provide VoIP services to its client.

Figure 2:
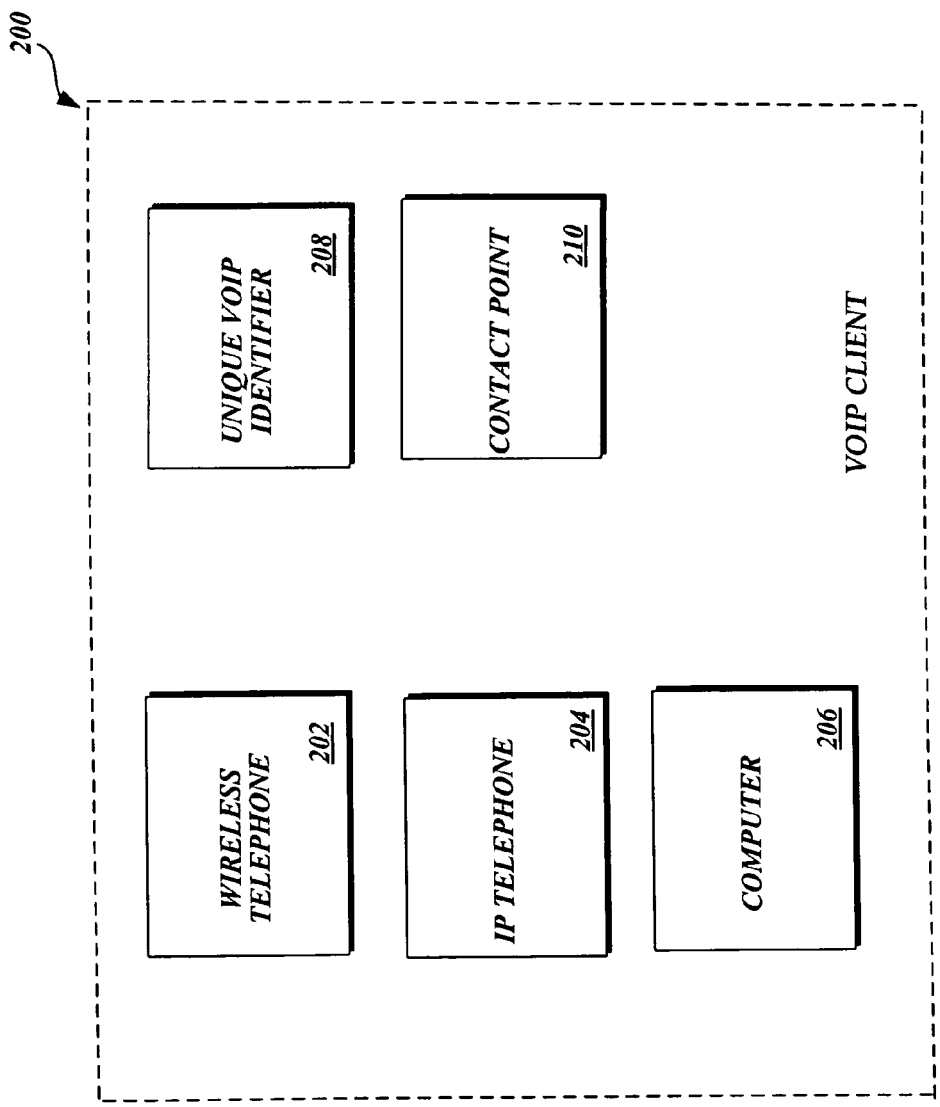
FIG. 2 is a block diagram illustrative of a VoIP client in accordance with an aspect of the present invention.

Referring now to FIG. 2, a block diagram illustrating an exemplary VoIP client 200 that includes several VoIP devices and a unique VoIP identifier, in accordance with an embodiment of the present invention, is shown. Each VoIP device 202, 204, 206 may include a storage that is used to maintain voice messages, address books, client specified rules, priority information related to incoming calls, etc. Alternatively, or in addition thereto, a separate storage, maintained for example by a service provider, may be associated with the VoIP client and accessible by each VoIP device that contains information relating to the VoIP client. In an embodiment, any suitable VoIP device such as a wireless phone 202, an IP phone 204, or a computer 206 with proper VoIP applications may be part of the VoIP client 200. The VoIP client 200 also maintains one or more unique VoIP identifier 208. The unique VoIP identifier(s) 208 may be constant or change over time. For example, the unique identifier(s) 208 may change with each call. The unique VoIP identifier is used to identify the client and to connect with the contact point 210 associated with the VoIP client. The unique VoIP identifier may be maintained on each VoIP device included in the VoIP client and/or maintained by a service provider that includes an association with each VoIP device included in the VoIP client. In the instance in which the unique VoIP identifier is maintained by a service provider, the service provider may include information about each associated VoIP device and knowledge as to which device(s) to connect for incoming communications. In alternative embodiment, the VoIP client 200 may maintain multiple VoIP identifiers. In this embodiment, a unique VoIP identifier may be temporarily assigned to the VoIP client 200 for each call session.

The unique VoIP identifier may be used similar to a telephone number in PSTN. However, instead of dialing a typical telephone number to ring a specific PSTN device, such as a home phone, the unique VoIP identifier is used to reach a contact point, such as an individual or company, which is associated with the VoIP client. Based on the arrangement of the client, the appropriate device(s) will be connected to reach the contact point. In one embodiment, each VoIP device included in the VoIP client may also have its own physical address in the network or a unique device number. For example, if an individual makes a phone call to a POTS client using a personal computer (VoIP device), the VoIP client identification number in conjunction with an IP address of the personal computer will eventually be converted into a telephone number recognizable in PSTN.

Figure 3:
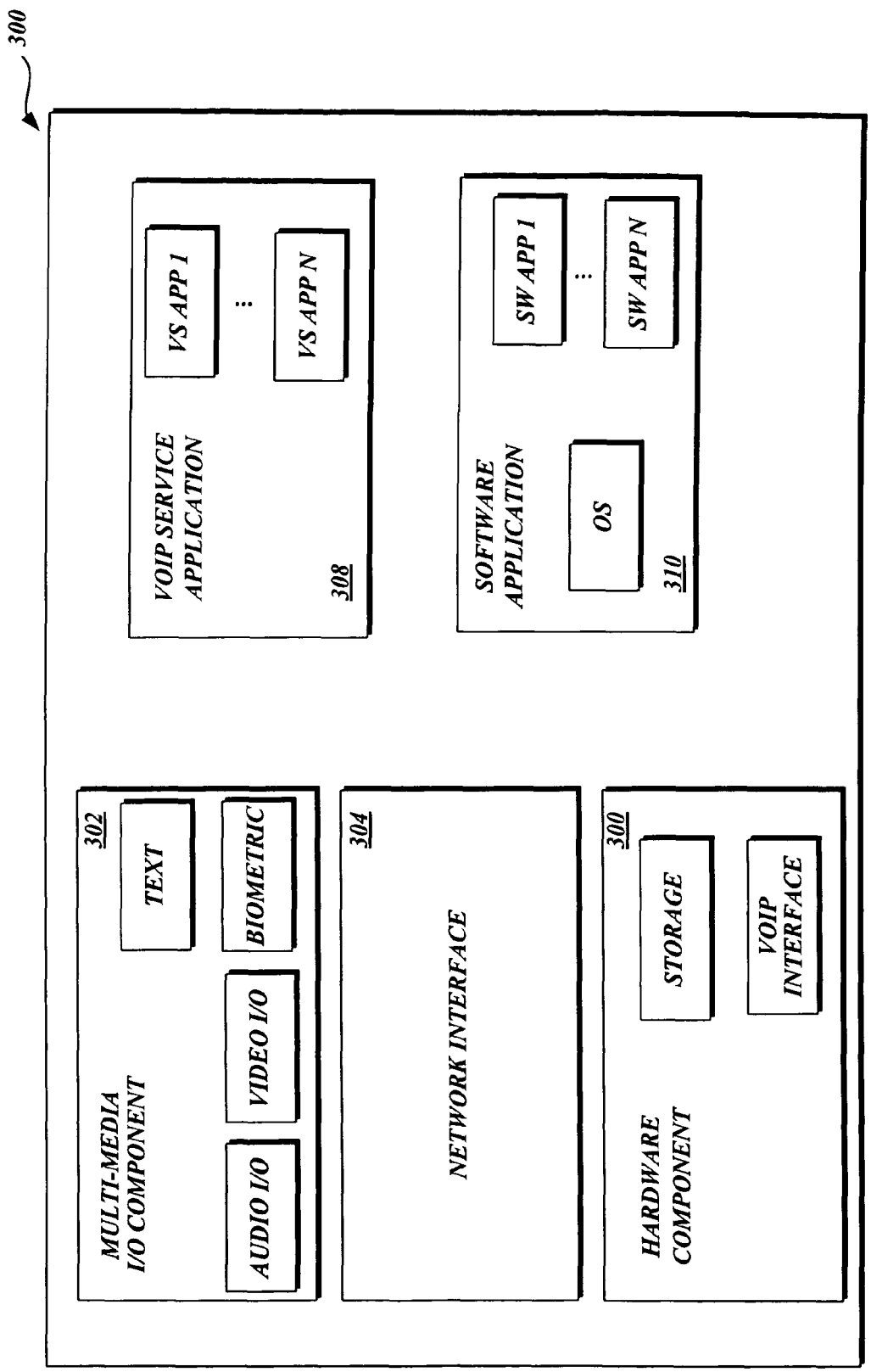
FIG. 3 is a block diagram illustrative of various components associated with a VoIP device in accordance with an aspect of the present invention.

FIG. 3 is a block diagram of a VoIP device 300 that may be associated with one or more VoIP clients and used with embodiments of the present invention. It is to be noted that the VoIP device 300 is described as an example. It will be appreciated that any suitable device with various other components can be used with embodiments of the present invention. For utilizing VoIP services, the VoIP device 300 may include components suitable for receiving, transmitting and processing various types of data packets. For example, the VoIP device 300 may include a multimedia input/output component 302 and a network interface component 304. The multimedia input/output component 302 may be configured to input and/or output multimedia data (including audio, video, and the like), user biometrics, text, application file data, etc.

The multimedia input/output component 302 may include any suitable user input/output components such as a microphone, a video camera, a display screen, a keyboard, user biometric recognition devices, and the like. The multimedia input/output component 302 may also receive and transmit multimedia data via the network interface component 304. The network interface component 304 may support interfaces such as Ethernet interfaces, frame relay interfaces, cable interfaces, DSL interfaces, token ring interfaces, radio frequency (air interfaces), and the like. The VoIP device 300 may comprise a hardware component 306 including permanent and/or removable storage such as read-only memory devices (ROM), random access memory (RAM), hard drives, optical drives, and the like. The storage may be configured to store program instructions for controlling the operation of an operating system and/or one or more applications and to store contextual information related to individuals (e.g., voice profiles, user biometrics information, etc) associated with the VoIP client in which the device is included. In one embodiment, the hardware component 306 may include a VoIP interface card which allows non-VoIP client device to transmit and receive a VoIP conversation.

The device 300 may further include a software application component 310 for the operation of the device 300 and a VoIP Service application component 308 for supporting various VoIP services. The VoIP service application component 308 may include applications such as data packet assembler/disassembler applications, a structured hierarchy parsing application, audio Coder/Decoder (CODEC), video CODEC and other suitable applications for providing VoIP services. The CODEC may use voice profiles to filter and improve incoming audio.

Figure 4A:
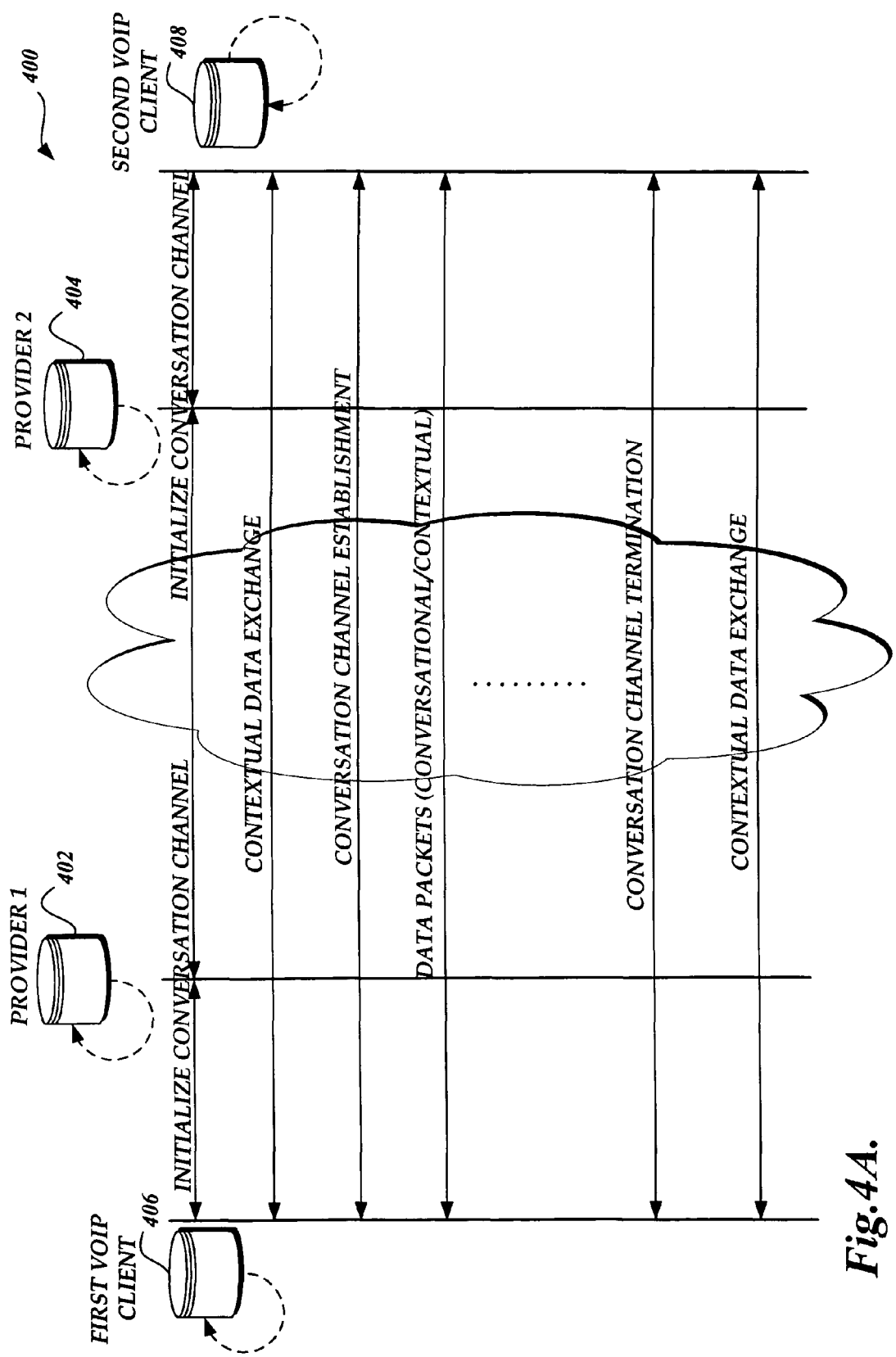
FIGS. 4A and 4B are block diagrams illustrative of the exchange of data between two VoIP clients over a conversation channel in accordance with an aspect of the present invention.

With reference to FIG. 4A, a block diagram illustrative of a conversation flow 400 between VoIP devices of two different VoIP clients over a conversation channel, in accordance with an embodiment of the present invention, is shown. During a connection set-up phase, a VoIP device of a first VoIP client 406 requests to initiate a conversation channel with a second VoIP client 408. In an illustrative embodiment, a VoIP service provider 402 (Provider 1) for the first VoIP client 406 receives the request to initiate a conversation channel and forwards the request to a VoIP service provider 404 (Provider 2) for the second VoIP client 406. While this example utilizes two VoIP service providers and two VoIP clients, any number and combination of VoIP clients and/or service providers may be used with embodiments of the present invention. For example, only one service provider may be utilized in establishing the connection. In yet another example, communication between VoIP devices may be direct, utilizing public and private lines, thereby eliminating the need for a VoIP service provider. In a peer to peer context, communication between VoIP devices may also be direct without having any service providers involved.

There are a variety of protocols that may be selected for use in exchanging information between VoIP clients, VoIP devices, and/or VoIP service providers. For example, when Session Initiation Protocol (SIP) is selected for a signaling protocol, session control information and messages will be exchanged over a SIP signaling path/channel and media streams will be exchanged over Real-Time Transport Protocol (RTP) path/channel. For the purpose of discussion, a communication channel, as used herein, generally refers to any type of data or signal exchange path/channel. Thus, it will be appreciated that depending on the protocol, a connection set-up phase and a connection termination phase may require additional steps in the conversation flow 400.

For ease of explanation, we will utilize the example in which both the first VoIP client 406 and the second VoIP client 408 each only includes one VoIP device. Accordingly, the discussion provided herein will refer to connection of the two VoIP devices. The individual using the device of the first VoIP client 406 may select or enter the unique VoIP identifier of the client that is to be called. Provider 1 402 receives the request from the device of the first VoIP client 408 and determines a terminating service provider (e.g., Provider 2 404 of the second VoIP client 408) based on the unique VoIP identifier included in the request. The request is then forwarded to Provider 2 404. This call initiation will be forwarded to the device of the second VoIP client. A conversation channel between the device of the first VoIP client 406 and a device of the second VoIP client 408 can then be established.

In an illustrative embodiment, before the devices of the first VoIP client 406 and the second VoIP client 408 begin to exchange data packets, contextual information may be exchanged. As will be discussed in a greater detail below, the contextual information may be packetized in accordance with a predefined structure that is associated with the conversation. Any device associated with the first VoIP client 406, the service provider of the first VoIP client 406, or a different device/service provider may determine the structure based on the content of the contextual information. In one embodiment, the exchanged contextual information may include information relating to the calling VoIP client 406, the device, and the VoIP client 408 being called. For example, the contextual information sent from the called VoIP client 406 may include priority list of incoming calls from various potential calling VoIP clients including VoIP client 406.

Available media types, rules of the calling client and the client being called, and the like, may also be part of the contextual information that is exchanged during the connection set-up phase. The contextual information may be processed and collected by one the devices of the first VoIP client 406, one of the devices of the second VoIP client 408, and/or by VoIP service providers (e.g., Provider 1 402 and Provider 2 404), depending on the nature of the contextual information. In one embodiment, the VoIP service providers 402, 404 may add/or delete some information to/from the client's contextual information before forwarding the contextual information.

In response to a request to initiate a conversation channel, the second VoIP client 408 may accept the request for establishing a conversation channel or execute other appropriate actions such as rejecting the request via Provider 2 404. The appropriate actions may be determined based on the obtained contextual information. When a conversation channel is established, a device of the first VoIP client 406 and a device of the second VoIP client 408 start communicating with each other by exchanging data packets. As will be described in greater detail, the data packets, including conversation data packets and contextual data packets, are communicated over the established conversation channel between the connected devices.

Conversation data packets carry data related to a conversation, for example, a voice data packet, or multimedia data packet. Contextual data packets carry information relating to data other than the conversation data. Once the conversation channel is established, either the first VoIP client 406 or the second VoIP client 408 can request to terminate the conversation channel. Some contextual information may be exchanged between the first VoIP client 406 and the second VoIP client 408 after the termination.

Figure 4B:
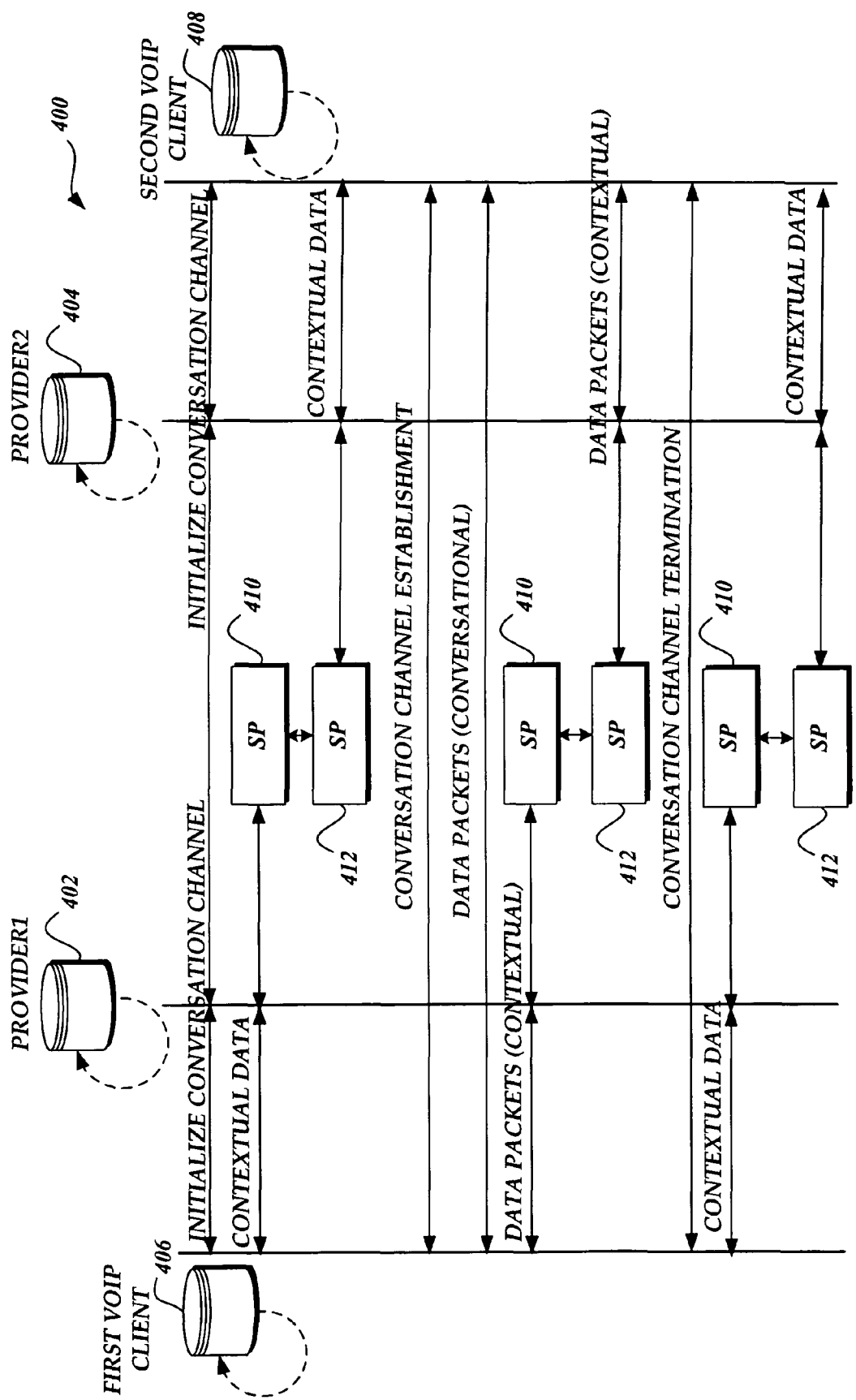

FIG. 4B is a block diagram illustrative of a conversation flow 400 between devices of two VoIP clients via several service providers, in accordance with an embodiment of the present invention. As with FIG. 4A, the example described herein will utilize the scenario in which each client only has one device associated therewith and the connection occurs between those two devices. During a connection set-up phase, a device of a first VoIP client 406 requests to initiate a conversation channel for communication with a second VoIP client 408. In an illustrative embodiment, a VoIP service provider 402 (Provider1) for the first VoIP client 406 receives the request to initiate a conversation channel and forwards the request to a VoIP service provider 404 (Provider2) for the second VoIP client 408.

Before the device of the first VoIP client 406 and the device of the second VoIP client 408 begin to exchange voice data packets, contextual information may be exchanged between the first VoIP client 406 and the second VoIP client 408. Contextual information may be exchanged using a structured organization defined by the first VoIP client 406. In one embodiment, Provider 1 402 may identify particular contextual information which Provider 1 402 desires to obtain from the first VoIP client 406. The first VoIP client 406 may specify the corresponding structure based on the content of the contextual information. The identification of the structure for exchanging information and additional contextual information may be transmitted to the second VoIP client 408 via Provider 2 404 and Provider 1 402.

The contextual information may be processed and collected at a device of the first VoIP client, a device of the second VoIP client, and/or the VoIP service providers (e.g., Provider1 and Provider2), depending on the nature of the contextual information. For example, voice profiles may be collected by the service providers 402, 404, and only temporarily provided to the devices. Further, third-party Service Provider(s) (third-party SP) 410, 412 can obtain and/or add contextual information exchanged among devices of the first VoIP client 406 and second VoIP client 408, Provider 1 402, and Provider 2 404. In one embodiment, any of Provider 1 402, Provider 2 404, and third-party SP 410, 412 may add, modify and/or delete contextual information before forwarding the contextual information to the next VoIP device(s), including other service providers.

In response to a request to initiate a conversation channel, the second VoIP client 408 may accept the request for establishing a conversation channel or reject the request via Provider 2 404. When a conversation channel has been established, the devices of the first VoIP client 406 and the second VoIP client 408 start communicating with each other by exchanging data packets as discussed above. In one embodiment, contextual and/or conversation data packets may be forwarded to third-party SPs 410, 412 from Provider 1 402, Provider 2 404, or from either VoIP client 406, 408. Further, the forwarded contextual and/or conversation data packets may be exchanged among various third-party SPs 410, 412.

Figure 5:
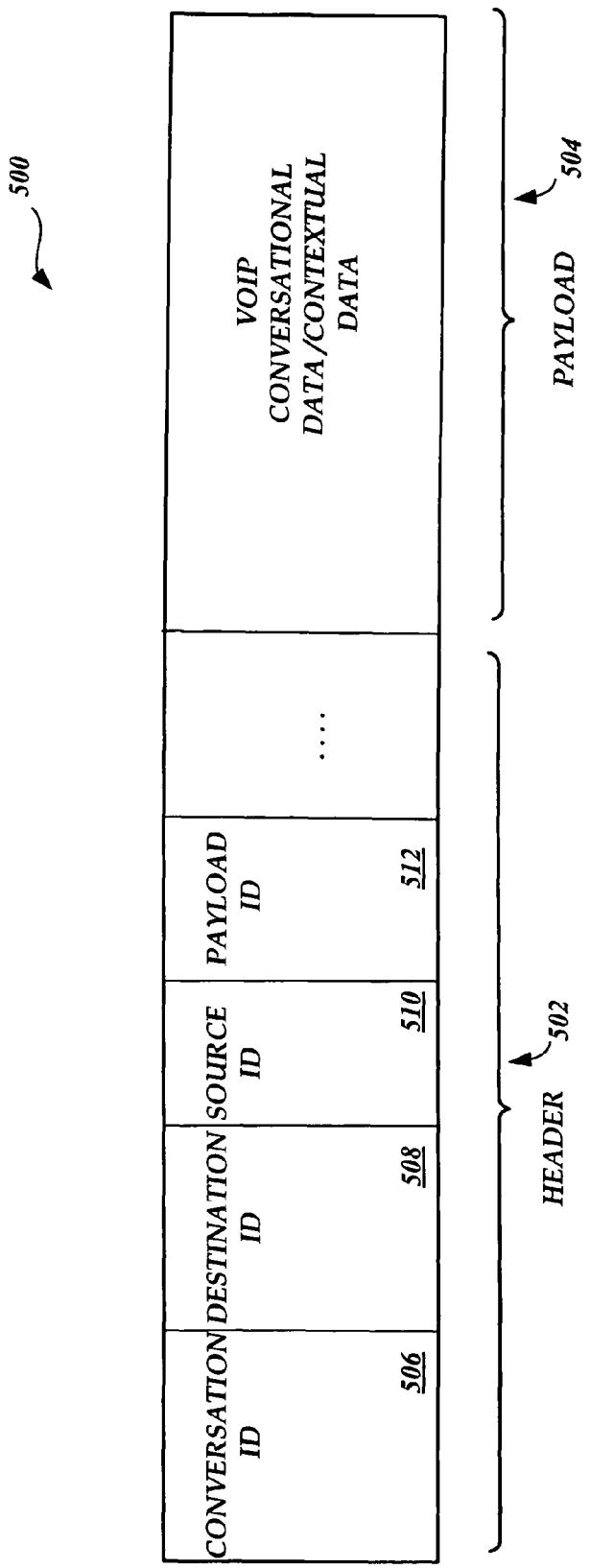
FIG. 5 is a block diagram of a data packet used over a communication channel established in the VoIP environment of FIG. 1.

FIG. 5 is a block diagram of a data packet structure 500 used over a communication (conversation) channel in accordance with an embodiment of the present invention. The data packet structure 500 may be a data packet structure for an IP data packet suitable for being utilized to carry conversation data (e.g., voice, multimedia data, and the like) or contextual data (e.g., information relating to the VoIP services, and the like). However, any other suitable data structure can be utilized to carry conversation data or contextual data. The data packet structure 500 includes a header 502 and a payload 504, The header 502 may contain information necessary to deliver the corresponding data packet to a destination. Additionally, the header 502 may include information utilized in the process of a conversation. Such information may include conversation ID 506 for identifying a conversation (e.g., call), a Destination ID 508, such as a unique VoIP identifier of the client being called, a Source ID 510 (unique VoIP identifier of the calling client or device identifier), Payload ID 512 for identifying type of payload (e.g., conversation or contextual), individual ID (not shown) for identifying the individual for which the conversation data is related, and the like. In an alternative embodiment, the header 502 may contain information regarding Internet protocol versions, and payload length, among others. The payload 504 may include conversational or contextual data relating to an identified conversation. As will be appreciated by one of ordinary skill in the art, additional headers may be used for upper layer headers such as a TCP header, a UDP header, and the like.

In one embodiment of the present invention, a structured hierarchy may be predefined for communicating contextual information over a VoIP conversation channel. The contextual information may include any information relating to VoIP clients, VoIP devices, conversation channel connections (e.g., call basics), conversation context (e.g., call context), and the like. More specifically, the contextual information may include client preference, client rules, client's location (e.g., user location, device location, etc.), biometrics information, the client's confidential information, VoIP device's functionality, VoIP service providers information, media type, media parameters, calling number priority, keywords, information relating to application files, and the like. The contextual information may be processed and collected at each VoIP client and/or the VoIP service providers depending on the nature of the contextual data. In one aspect, the VoIP service providers may add, modify, and/or delete VoIP client's contextual data before forwarding the contextual information. For example, client's confidential information will be deleted by the VoIP service provider associated with that client unless the client authorizes such information to be transmitted. In some cases, a minimal amount of contextual information is transmitted outside of an intranet network.

Figure 6:
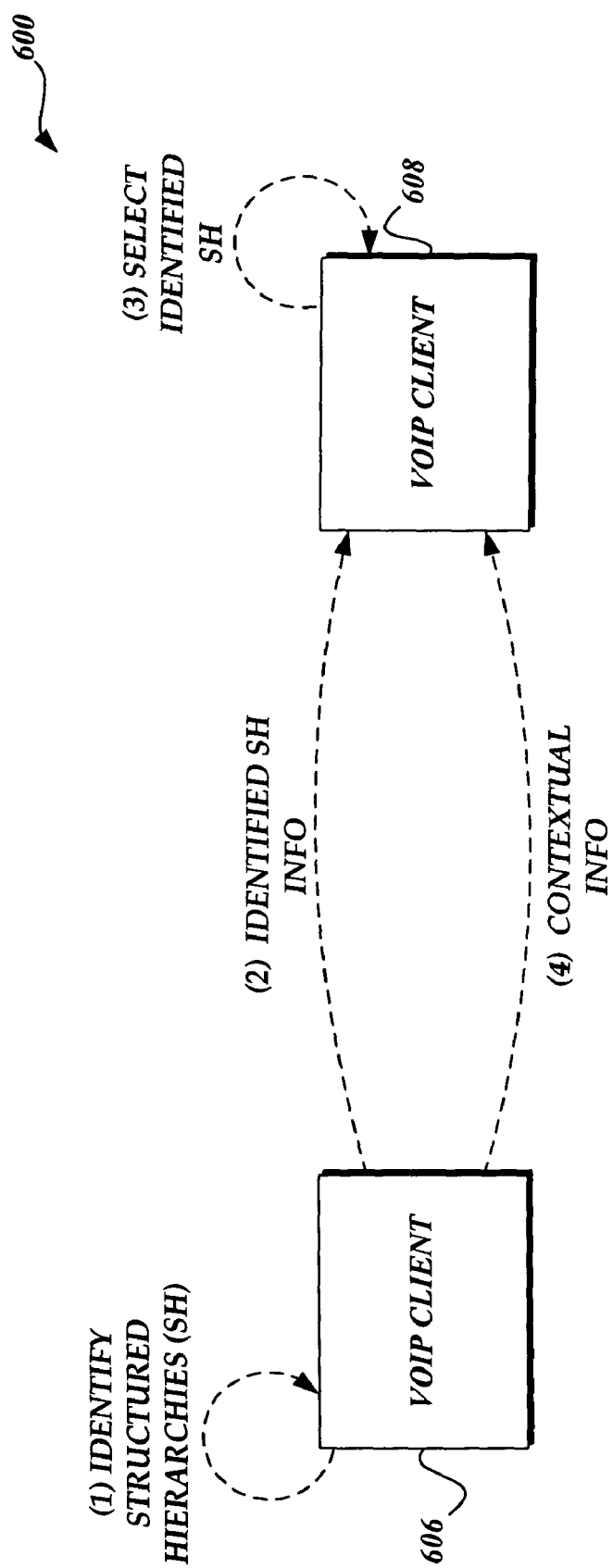
FIG. 6 is a block diagram illustrating interactions between two VoIP clients for transferring contextual information defined by identified structured hierarchies in accordance with an aspect of the present invention.

With reference to FIG. 6, a block diagram 600 illustrating interactions between two VoIP clients for transferring contextual information, in accordance with an embodiment of the present invention, is shown. As with FIGS. 4A and 4B, the example described herein will utilize the scenario in which each client only has one device associated therewith and the connection occurs between those two devices. In one embodiment, devices of VoIP Client 606 and VoIP Client 608 have established a VoIP conversation channel. It may be identified which structured hierarchies will be used to carry certain contextual information by VoIP Client 606. The information regarding the identified structured hierarchies may include information about which structured hierarchies are used to carry the contextual information, how to identify the structured hierarchy, and the like. Such information will be exchanged between VoIP Client 606 and VoIP Client 608 before the corresponding contextual information is exchanged. Upon receipt of the information about which structured hierarchy is used to carry the contextual information, VoIP Client 608 looks up predefined structured hierarchies (e.g., XML namespace and the like) to select the identified structured hierarchies. In one embodiment, the predefined structured hierarchies can be globally stored and managed in a centralized location accessible from a group of VoIP clients. In this embodiment, a Uniform Resource Identifier (URI) address of the centralized location may be transmitted from VoIP Client 606 to VoIP Client 608.

In another embodiment, each VoIP client may have a set of predefined structured hierarchies stored in a local storage of any devices or a dedicated local storage which all devices can share. The predefined structured hierarchies may be declared and agreed upon between VoIP clients before contextual information is exchanged. In this manner, the need to provide the structure of the contextual data packets may be eliminated and thus the amount of transmitted data packets corresponding to the contextual data is reduced. Further, by employing the predefined structured hierarchies, data packets can be transmitted in a manner which is independent of hardware and/or software.

Upon retrieving the identified structured hierarchy, VoIP Client 608 is expecting to receive a data stream such that data packets corresponding to the data stream are defined according to the identified structured hierarchies. VoIP Client 606 can begin sending contextual information represented in accordance with the identified structured hierarchies. In one embodiment, VoIP Client 608 starts a data binding process with respect to the contextual information. For example, instances of the identified structured hierarchies may be constructed with the received contextual information.

Figure 7A:
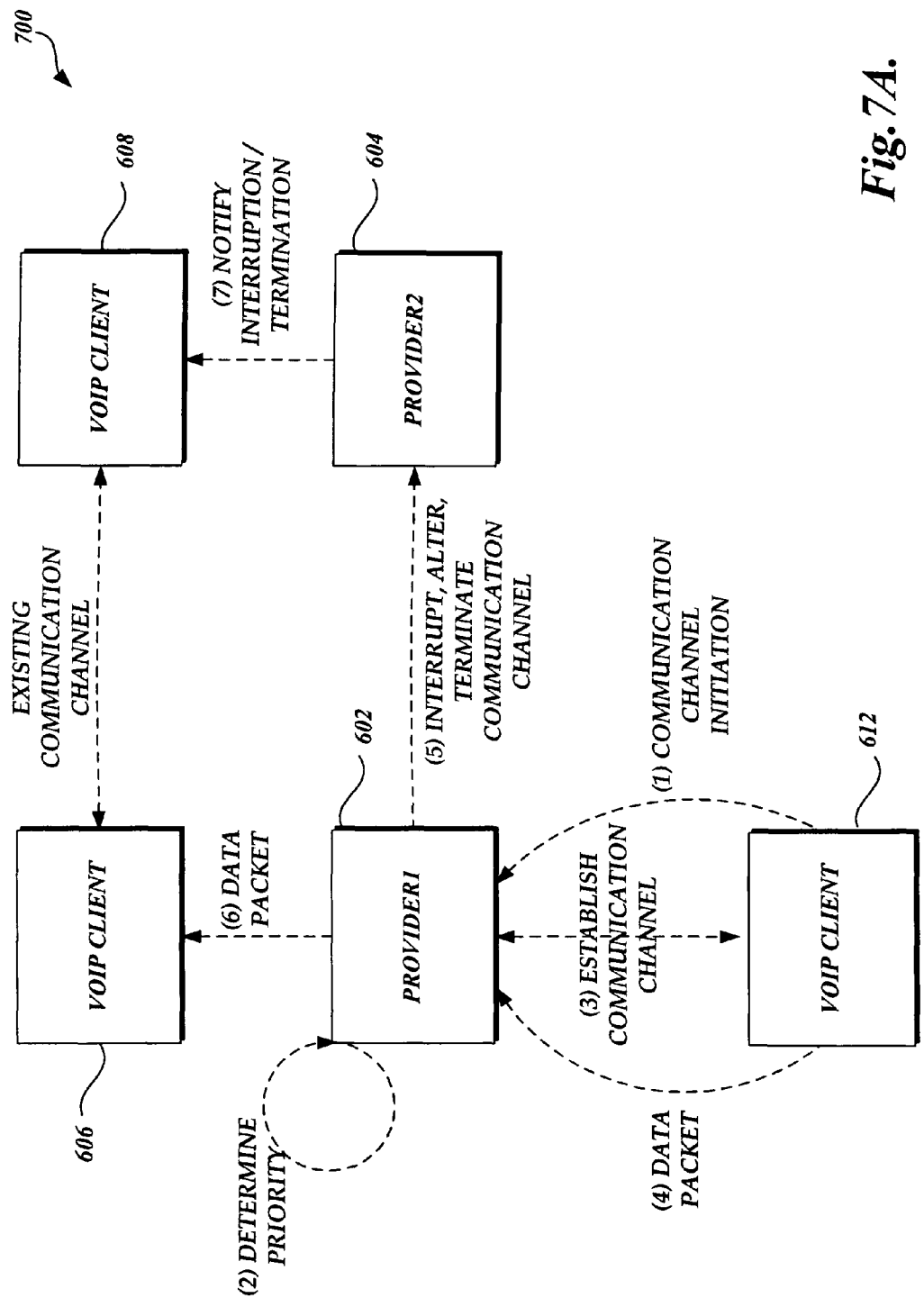
FIGS. 7A-7C are block diagrams illustrative of interactions among VoIP entities in the VoIP environment utilizing data packet prioritization in accordance with an embodiment of the present invention.
Figure 7B:
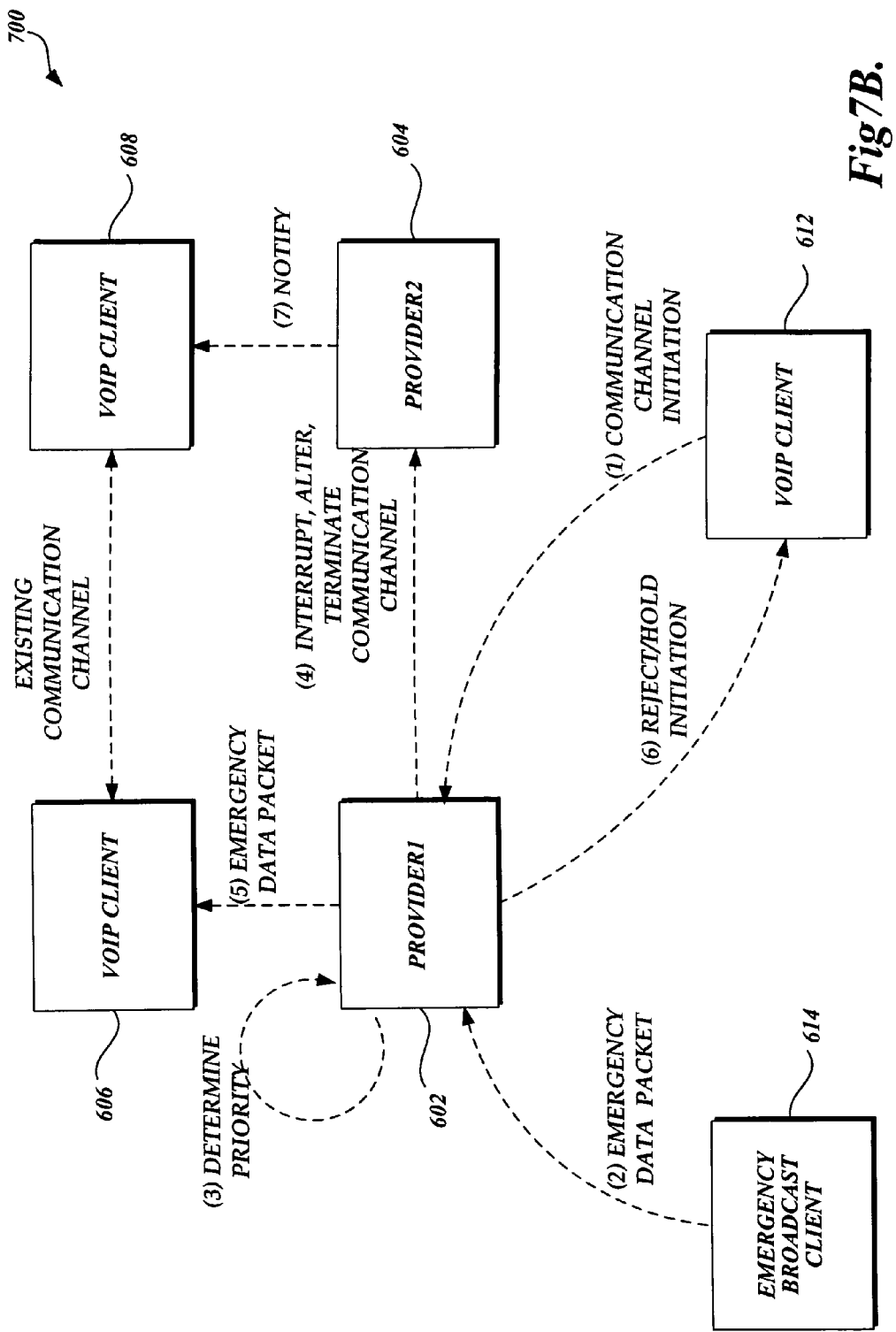
Figure 7C:
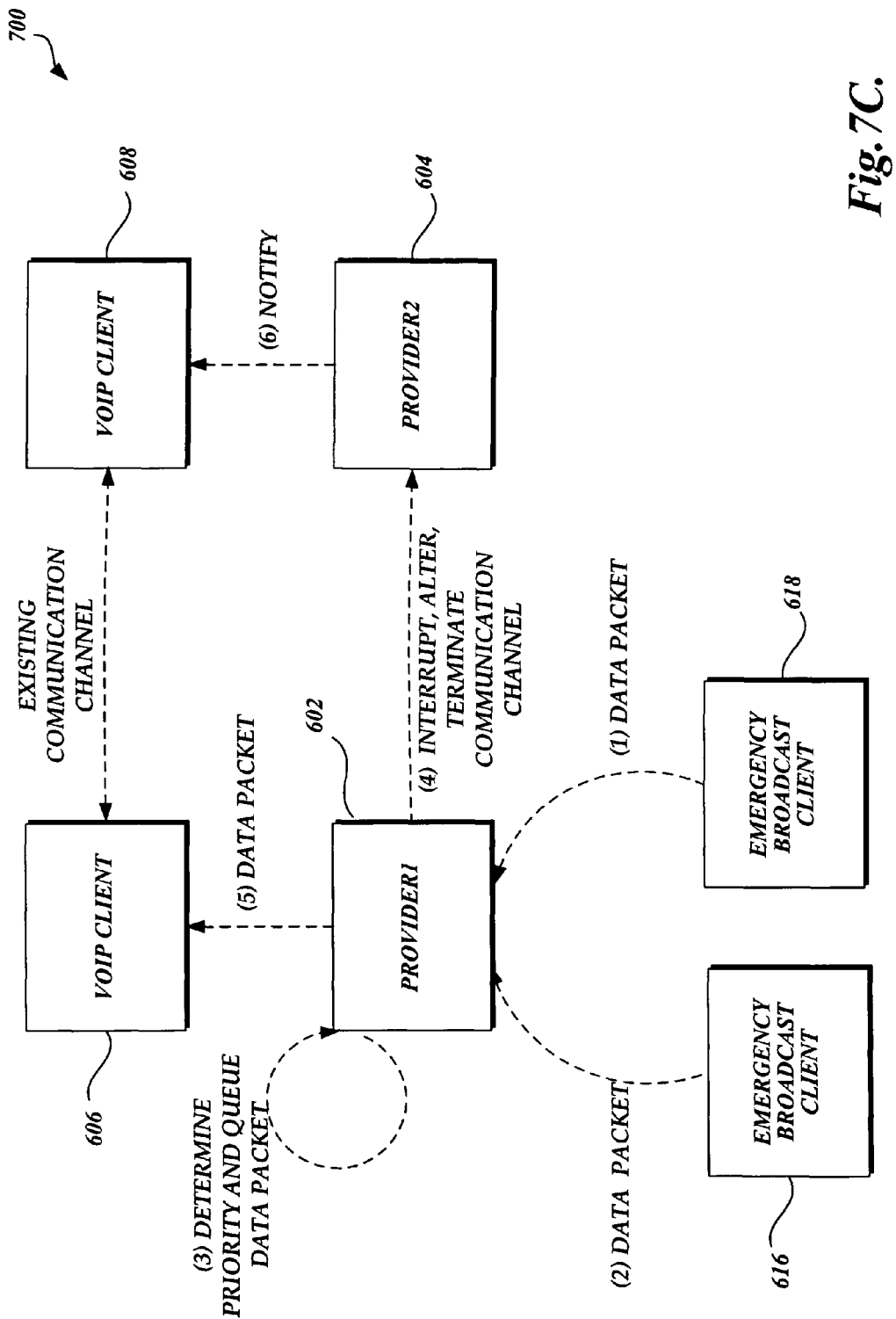
Figure 8:
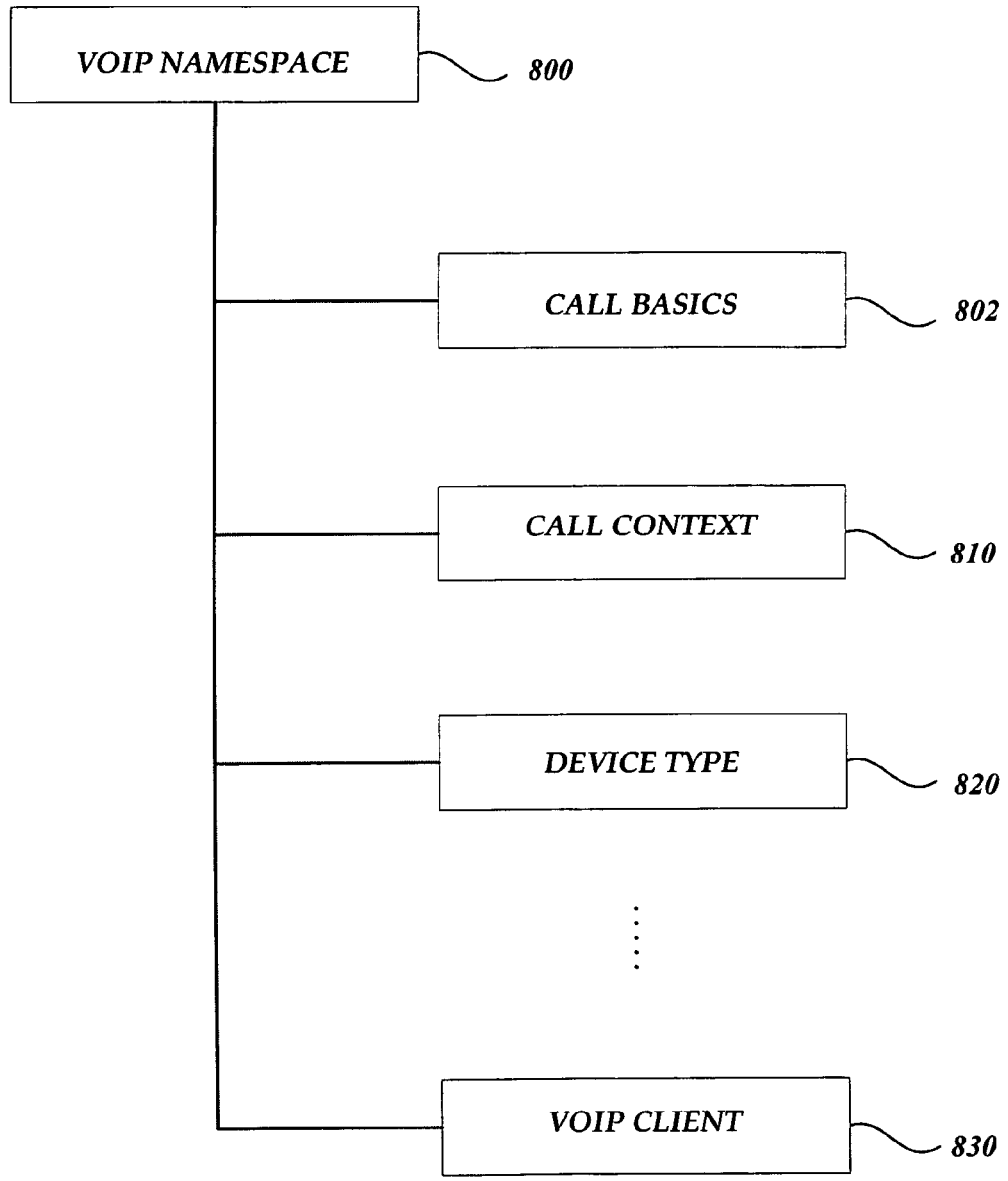
FIGS. 8-12 are block diagrams illustrative of various attribute and classes of structured hierarchies corresponding to VoIP contextual information in accordance with an aspect of the present invention.

FIGS. 7A-7C are block diagrams 700 illustrating interactions among VoIP entities in the VoIP environment utilizing data packet prioritization in accordance with an aspect of the present invention. In one embodiment, the VoIP entities may include VoIP clients, VoIP service providers for the clients, third-party service providers and the like. It is to be noted that one of ordinary skill in the relevant art will appreciate that any suitable entities may be included in the IP telephone environment.

With reference to FIG. 7A, in one embodiment, VoIP Client 606 may already have an existing communication channel with VoIP Client 608. While this example utilizes two VoIP service providers and two VoIP clients, any number and combination of VoIP clients and/or service providers may be used with embodiments of the present invention. A service provider of VoIP Client 606, Provider 1 602 has already obtained contextual information including priority information from VoIP Client 606. As will be described in greater detail below, it is contemplated that structured hierarchies are utilized to carry contextual information (contextual data packets) between several VoIP entities in this illustrative embodiment. In the embodiment, Provider 1 602 may receive a request from VoIP Client 612 to initiate a communication channel between devices of VoIP Client 612 and VoIP Client 606. Provider 1 602 may determine priority levels of VoIP Client 608 and VoIP Client 612 based on the priority information obtained from VoIP Client 606. In one embodiment, contextual information corresponding to the priority information may include a predefined priority level for each potential VoIP client that may call VoIP Client 606. Alternatively, a predefined priority level can be specified based on a membership associated with a particular group of potential callers, or the VoIP client associated with the caller. In this example, if a potential caller is identified as a member of a particular group (e.g., a family, a customer, an emergency, a project team, etc), a priority level of the particular group will be assigned to the potential caller.

If Provider 1 602 determines that VoIP Client 612 has higher priority than VoIP Client 608, Provider 1 602 accepts the request to initiate a communication channel between VoIP Client 612 and VoIP Client 606. The communication channel is established between VoIP Client 612 and VoIP Client 606. VoIP Client 612 starts sending data packets to Provider 1 602 over the established communication channel. In one embodiment, Provider 1 602 may terminate, interrupt, or alter the existing communication channel between VoIP Client 606 and VoIP Client 608. Upon termination of the existing communication channel, Provider 2 604 may notify VoIP Client 608 of the termination. In an alternative embodiment, Provider 1 602 may interrupt the existing communication channel by putting on hold data packets transmitted from VoIP Client 608. Upon interruption of the existing communication channel, Provider 2 604 may notify VoIP Client 608 of the interruption. As will be appreciated by one of ordinary skill in the art, VoIP Client 608 can terminate the communication channel any time during the interruption. After the communication channel between VoIP Client 606 and VoIP Client 608 has been terminated or interrupted, VoIP Client 606 and VoIP Client 612 can exchange data packets between each other over the newly established communication channel. Provider 1 602 may transmit the data packets received from VoIP Client 612 to the VoIP Client 606. It is contemplated that an authorized VoIP client or device can force a change in priority levels of data packets even after the priority levels have been determined. Such a change may occur at any time (e.g., before, during, and/or after a conversation). It is also contemplated that the priority levels of data packets can be dynamically evaluated and altered based on contextual information received from VoIP clients, service providers, or other VoIP entities.

In one embodiment, priority levels of data packets may be determined based on numerous kinds of information including priority of sending client, size, and type (e.g., multimedia, text, audio, application file, and the like) of data packets, callee preferences, and the like. In an illustrative embodiment, Provider 1 602 may determine the priority level of data packets based on the type of data packets when it is not able to compare the priority levels of VoIP Client 612 and VoIP Client 608. For example, VoIP Client 612 and VoIP Client 608 have the same level of priority. Provider 1 602 may assign priorities such that data packets requiring real-time data transfer have a higher priority than others. Similarly, Provider 1 602 may consider the size of the contextual information. Data packets relating to contextual information which have a small amount of information may have higher priority than others.

With reference to FIG. 7B, in another illustrative embodiment, a device of VoIP Client 606 may already have an existing communication channel with VoIP Client 608. Provider 1 602 may receive a request from VoIP Client 612 to initiate a new communication channel with VoIP Client 606. At approximately the same time, Provider 1 602 may receive an emergency data packet from Emergency Broadcast (EB) Client 614 (e.g., emergency broadcasting message to VoIP clients in certain geographic areas). It is contemplated that EB Client 614 may include any client with an authority to broadcast emergency data packets via its associated one or more providers. In this embodiment, Provider 1 602 may provide VoIP services to both VoIP Client 612 and EB Client 614. In order to decide which data packet is to be transmitted to VoIP Client 606, Provider 1 602 determines priority levels of VoIP Client 608, VoIP Client 612 and EB Client 614 based on the priority information obtained from VoIP Client 606. In one embodiment, the priority information may include a predefined priority level for each potential caller for the VoIP Client 606, a predefined priority level for a group of potential callers, or the like.

In an illustrative embodiment, VoIP Client 606 may have specified a higher priority level to EB Client 614 than VoIP Client 612 or VoIP Client 608. In this embodiment, Provider 1 602 may terminate, interrupt, or alter the existing communication channel in order to transmit EB data packets. Upon termination of the existing communication channel, Provider 2 604 may notify VoIP Client 608 of the termination. However, based on the client preference information of VoIP Client 606, Provider 1 602 may interrupt the existing communication channel by putting on hold data packets from VoIP Client 608. Upon interruption of the existing communication channel, Provider 2 604 may notify VoIP Client 608 of the interruption. VoIP Client 608 can terminate the existing communication channel any time during the interruption. Provider 1 602 rejects the request from VoIP Client 612 to initiate a communication channel.

After terminating, interrupting, or altering the communication channel between VoIP Client 606 and VoIP Client 608, Provider 1 602 may transmit the emergency data packets received from EB Client 614 to the VoIP Client 608. Generally, a typical two-way communication channel may not be necessary for emergency broadcasting and thus VoIP Client 606 can receive incoming data packets from EB Client 614 but not be able to send outgoing data packets to EB Client 614.

With reference to FIG. 7C, in one embodiment, a device of VoIP Client 606 may already have an existing communication channel with VoIP Client 608. Provider 1 602 may receive emergency data packets from one or more EB clients 616, 618. In this embodiment, Provider 1 602 may receive a first set of emergency data packets from EB Client 616 and a second set of emergency data packets from EB Client 618. Provider 1 602 may determine priority levels of EB Client 616 and EB Client 618 based on the priority information obtained from VoIP Client 606, or based on a predefined priority information for EB clients. In one embodiment, contextual information corresponding to the priority information may be exchanged to provide information relating to a predefined priority level for each potential caller for VoIP Client 606, a predefined priority level for a group of potential callers, or the like.

In one embodiment, VoIP Client 606 may have specified a predefined priority level for a group of potential callers. For example, VoIP Client 606 may have assigned the highest priority level to a group of EBs, the second highest priority level to Family members, the third highest level to Friends and so on. Although EBs have the highest priority, individual EBs (e.g., EB Client 616 and EB Client 618) can not be compared since they may have the same level of priority. In this embodiment, Provider1 may maintain a provider priority list for emergency clients and determine the priority level for EB Client 616 and EB Client 618 based on the provider priority list in conjunction with the priority information provided from VoIP Client 606.

For the purpose of discussion, assume that Provider 1 602 may determine that EB Client 616 has a higher priority than EB Client 618. As explained above, Provider 1 602 may terminate, interrupt, or alter the existing communication channel between VoIP Client 606 and VoIP Client 608. Upon termination of the existing communication channel, Provider 2 604 may notify VoIP Client 608 of the termination. Likewise, upon interruption of the existing communication channel, Provider 2 604 may notify VoIP Client 608 of the interruption. VoIP Client 608 can terminate the communication channel any time during the interruption. After terminating or interrupting the existing communication channel between VoIP Client 606 and VoIP Client 608, Provider 1 602 may transmit the emergency data packets transmitted from EB Client 616 to VoIP Client 606. As will be appreciated by one of ordinary skill in the art, a typical two-way communication channel may not be necessary for emergency broadcasting and thus VoIP Client 606 may receive incoming data packets from EB Client 614 but not be able to send outgoing data packets. In an alternative embodiment, Provider 1 602 may store data packets transmitted from EB Client 618 in a storage area such as a buffer and the like. The stored emergency data packets may be transmitted after data packets from EB Client 616 have been transmitted.

As mentioned above, structured hierarchies may be identified for communicating contextual information corresponding to called VoIP client's priority information. Further, the information regarding the identified structured hierarchies may be transmitted. The information regarding the identified structured hierarchies may include the information about which structured hierarchies carry the contextual information, how to identify the structured hierarchies, and the like. Subsequently, the contextual information corresponding to priority information may be represented in accordance with the identified structured hierarchies and transmitted.

In one embodiment, the structured hierarchies may be defined by Extensible Markup Language (XML). However, it is to be appreciated that the structured hierarchies can be defined by any language suitable for implementing and maintaining extensible structured hierarchies. Generally described, XML is well known for a cross-platform, software and hardware independent tool for transmitting information. Further, XML maintains its data as a hierarchically-structured tree of nodes, each node comprising a tag that may contain descriptive attributes. Typically, a XML namespace is provided to give the namespace a unique name. In some instances, the namespace may be used as a pointer to a centralized location containing default information about the namespace.

In an illustrative embodiment, VoIP Client 606 may identify a XML namespace for contextual information. For example, the XML namespace attribute may be placed in the start tag of a sending element. It is to be understood that XML namespaces, attributes, classes illustrated herein are provided merely as an example of structured hierarchies used in conjunction with various embodiments of the present invention. After VoIP Client 608 receives the XML namespace information, the VoIP Client 606 transmits a set of contextual data packets defined in accordance with the identified XML namespace to VoIP Client 608. When a namespace is defined in the start tag of an element, all child elements with the same prefix are associated with the same namespace. As such, VoIP Client 608 and VoIP Client 606 can transmit contextual information without including prefixes in all the child elements, thereby reducing the amount of data packets transmitted for the contextual information.

With reference to FIGS. 8-12, block diagrams illustrative of various classes and attributes of structured hierarchies corresponding to VoIP contextual information are shown. The VoIP contextual information exchanged between various VoIP entities (e.g., clients, service providers, etc.) may correspond to a VoIP namespace 800. In one embodiment, the VoIP namespace 800 is represented as a hierarchically structured tree of nodes, each node corresponding to a subclass which corresponds to a subset of VoIP contextual information. For example, a VoIP Namespace 800 may be defined as a hierarchically structured tree comprising a Call Basics Class 802, a Call Contexts Class 810, a Device Type Class 820, a VoIP Client Class 830, and the like.

Figure 9:
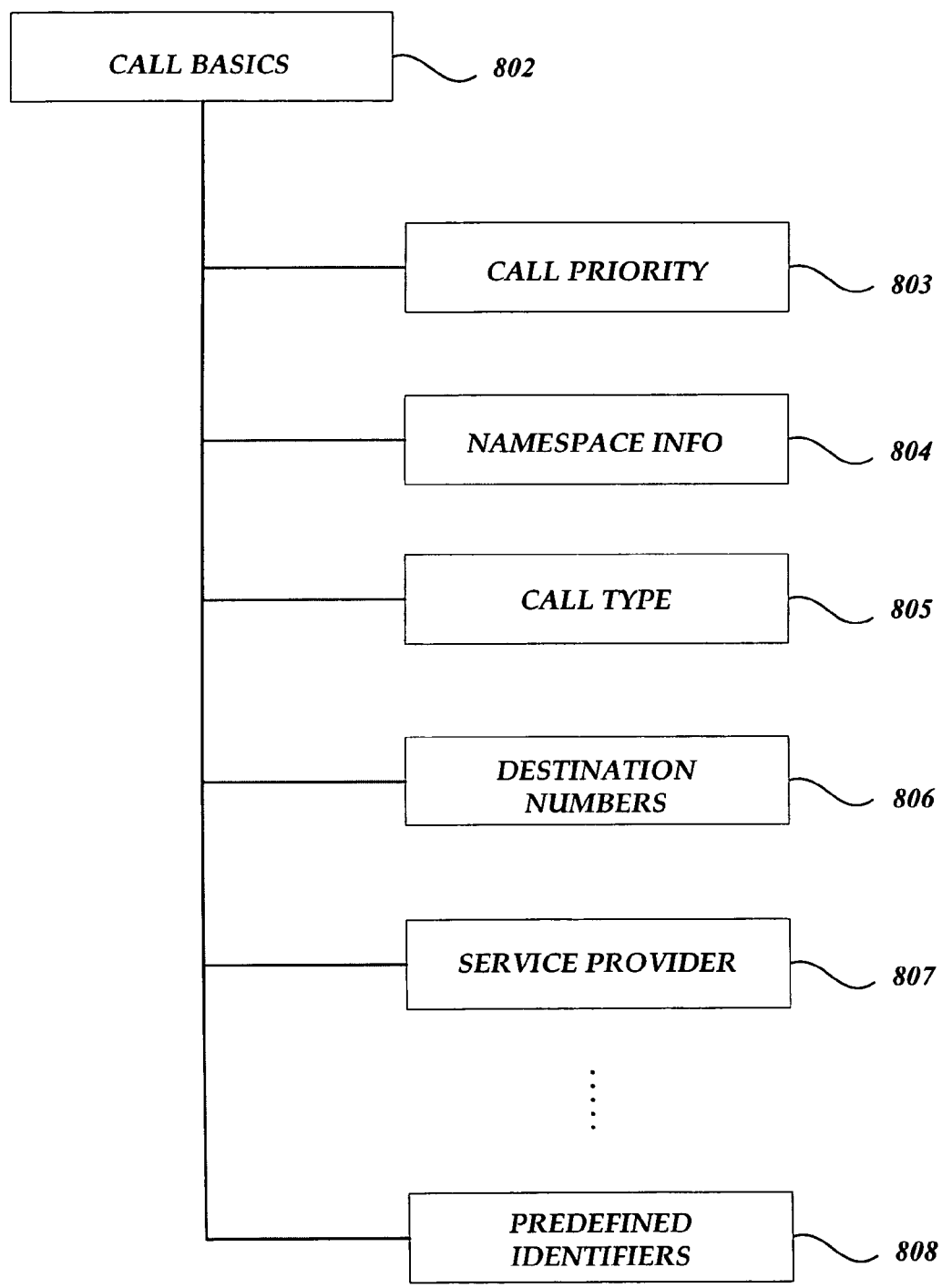

With reference to FIG. 9, a block diagram of a Call Basics Class 802 is shown. In an illustrative embodiment, Call Basics Class 802 may correspond to a subset of VoIP contextual information relating to a conversation channel connection (e.g., a PSTN call connection, a VoIP call connection, and the like). The subset of the VoIP contextual information relating to a conversation channel connection may include originating numbers (e.g., a caller's VoIP ID number), destination numbers (e.g., callees' VoIP ID numbers or telephone numbers), call connection time, VoIP service provider related information, and/or ISP related information such as IP address, MAC address, namespace information and the like. Additionally, the contextual information relating to a conversation channel connection may include call priority information (which defines the priority levels of the destination numbers), call type information, and the like. The call type information may indicate whether the conversation channel is established for an emergency communication, a broadcasting communication, a computer to computer communication, a computer to POTS device communication, and so forth. In one embodiment, the contextual information relating to a conversation channel connection may include predefined identifiers which represent emotions, sounds (e.g., "ah," "oops," "wow," etc.) and facial expressions in graphical symbols. In one embodiment, a Call Basics Class 802 may be defined as a sub-tree structure of a VoIP Namespace 800, which includes nodes such as call priority 803, namespace information 804, call type 805, destination numbers 806, service provider 807, predefined identifiers 808, and the like.

Figure 10:
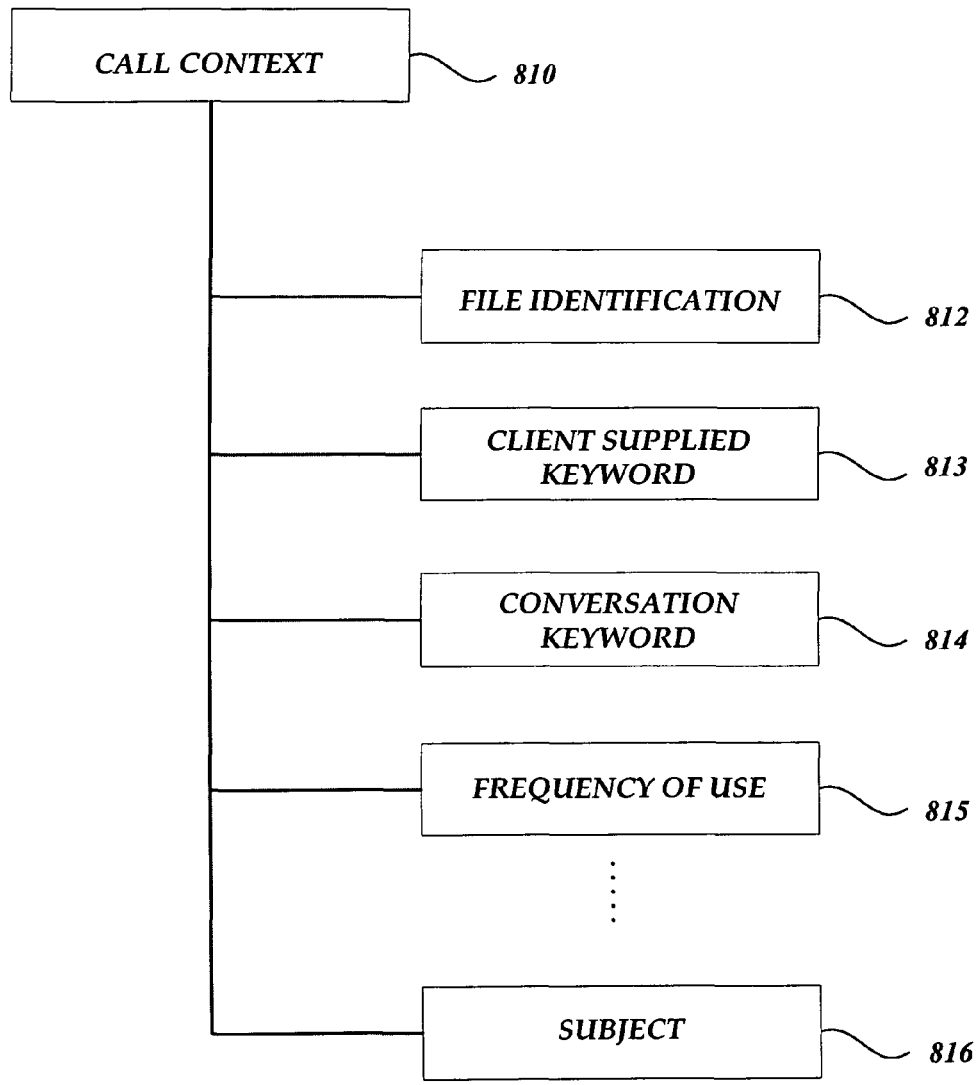

With reference to FIG. 10, a block diagram of a Call Contexts Class 810 is shown. In one embodiment, a subset of VoIP contextual information relating to conversation context may correspond to the Call Contexts Class 810. The contextual information relating to conversation context may include information such as client supplied keywords, identified keywords from document file data, identified keywords from a conversation data packet (e.g., conversation keywords), file names for documents and/or multimedia files exchanged as part of the conversation, game related information (such as a game type, virtual proximity in a certain game), frequency of use (including frequency and duration of calls relating to a certain file, a certain subject, and a certain client), and file identification (such as a case number, a matter number, and the like relating to a conversation), among many others. In accordance with an illustrative embodiment, a Call Contexts Class 810 may be defined as a sub-tree structure of a VoIP Namespace 800, which includes nodes corresponding to file identification 812, client supplied keyword 813, conversation keyword 814, frequency of use 815, subject of the conversation 816, and the like.

Figure 11:
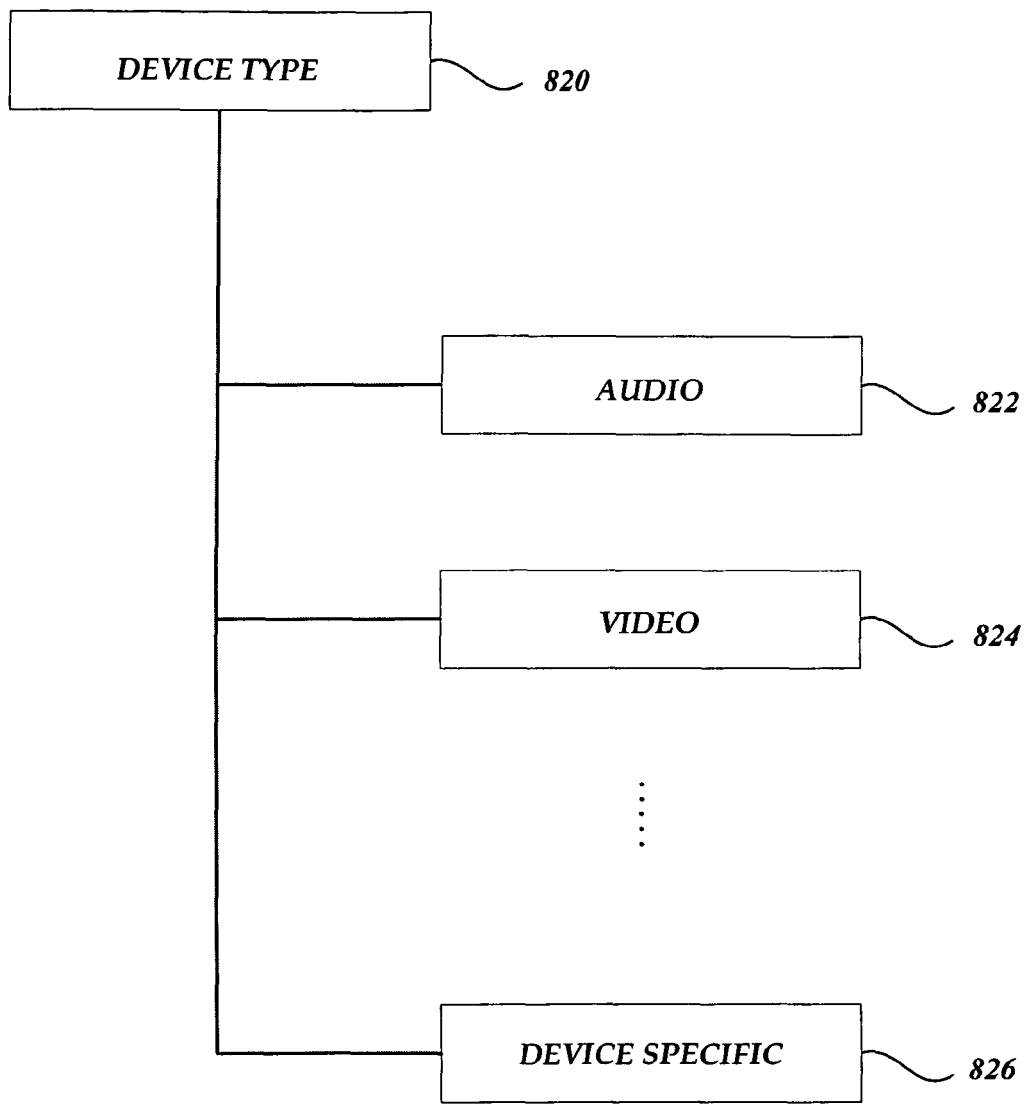

With reference to FIG. 11, a block diagram of a Device Type Class 820 is depicted. In one embodiment, a Device Type Class 820 may correspond to a subset of VoIP contextual information relating to a VoIP client device used for the conversation channel connection. The subset of the VoIP contextual information relating to the VoIP client device may include audio related information which may be needed to process audio data generated by the VoIP client device. The audio related information may include information related to the device's audio functionality and capability, such as sampling rate, machine type, output/input type, microphone, Digital Signal Processing (DSP) card information, and the like. The subset of the VoIP contextual information relating to the VoIP client device may include video related information which may be needed to process video data generated by the VoIP client device. The video related information may include resolution, refresh, type, and size of the video data, graphic card information, and the like. The contextual information relating to VoIP client devices may further include other device specific information such as a type of the computer system, processor information, network bandwidth, wireless/wired connection, portability of the computer system, processing settings of the computer system, and the like. In an illustrative embodiment, a Device Type Class 820 may be defined as a sub-tree structure of a VoIP Namespace 800, which includes nodes corresponding to Audio 822, Video 824, Device Specific 826, and the like.

Figure 12:
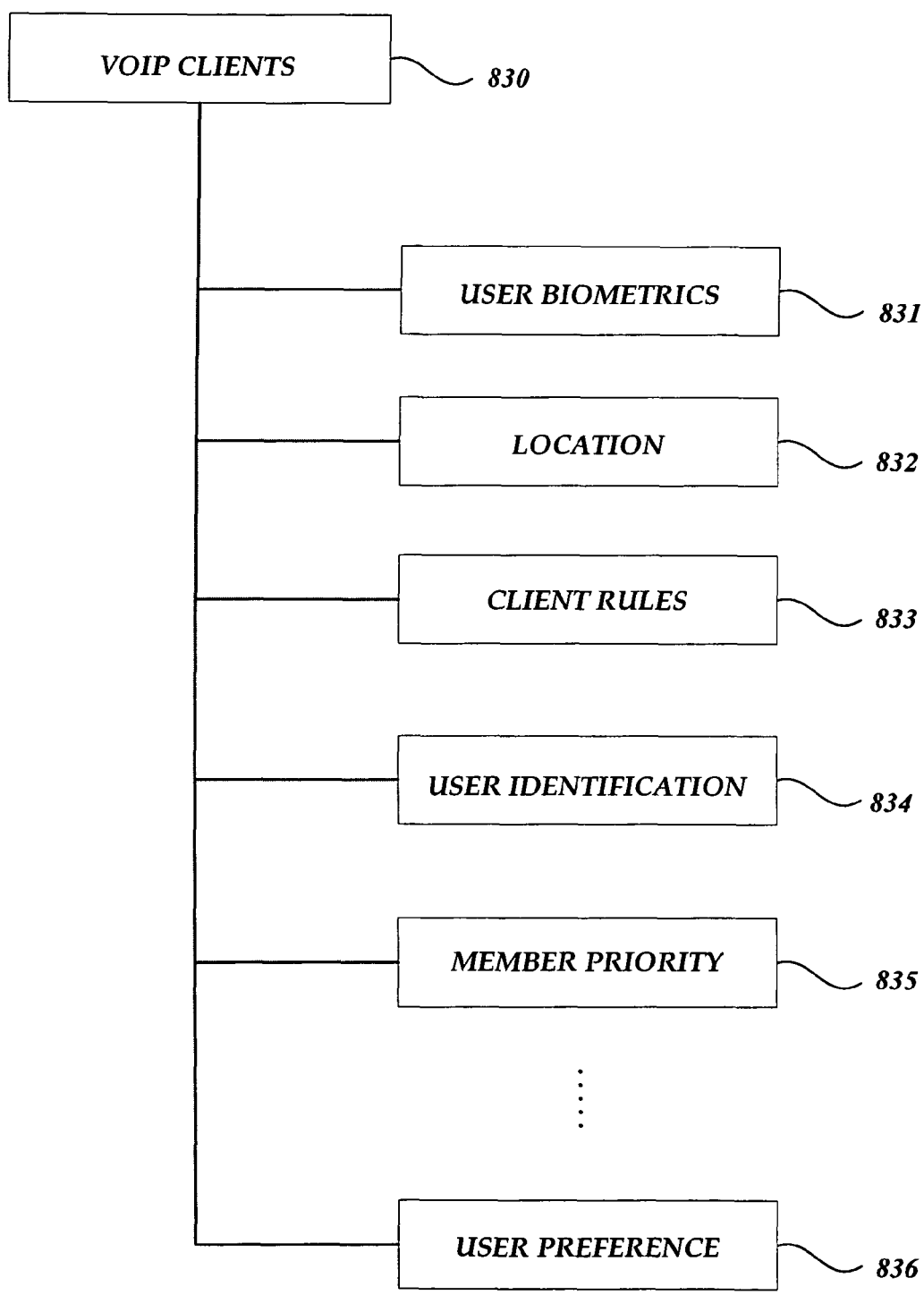

With reference to FIG. 12, a block diagram of a VoIP Client Class 830 is depicted. In accordance with an illustrative embodiment, a VoIP Client Class 830 may correspond to a subset of contextual information relating to VoIP clients. In one embodiment, the subset of the VoIP contextual information relating to the VoIP client may include voice profile information (e.g., a collection of information specifying the tonal and phonetic characteristics of an individual user), digital signature information, and biometric information. The biometric information can include user identification information (e.g., fingerprint) related to biometric authentication, user stress level, user mood, etc. Additionally, the subset of the VoIP contextual information relating to the VoIP client may include location information (including a client defined location, a VoIP defined location, a GPS/triangulation location, and a logical/virtual location of an individual user), assigned phone number, user contact information (such as name, address, company, and the like), rules defined by the client, user preferences, digital rights management (DRM), a member rank of an individual user in an organization, priority associated with the member rank, and the like. The priority associated with the member rank may be used to assign priority to the client for a conference call. In one embodiment, a VoIP Client Class 830 may be defined as a sub-tree structure of a VoIP Namespace 800, which includes nodes corresponding to user biometrics 831, location 832, client rules 833, user identification 834, member priority 835, user preference 836, and the like.

Now with reference to FIGS. 13-15, aspects of the present invention that are directed at obtaining and/or extracting contextual information that is related to a voicemail message will be described. Those skilled in the art and others will recognize that an Internet telephony environment 100 may include a voicemail system that allows a caller to leave an audio and/or multimodal message (e.g. audio with an electronic file) when a callee is unavailable. For example, a VoIP service provider 132 may provide VoIP clients 134 with voicemail services that allow a caller to leave messages in a voice mailbox for a callee. In this regard, a service provider 132 may automatically forward a data stream to a computing device associated with the callee that includes the voicemail message. In some systems, the callee may listen to the voicemail message from a local computing device using a voicemail or e-mail application. In other instances and by way of example only, a user may listen to voicemail messages by accessing an audio menu managed by a service provider.

A VoIP call conversation may be exchanged as a stream of data packets corresponding to voice information, media information, and/or contextual information. Contextual information typically provided in the metadata of a voicemail message includes the identity of the caller and/or the caller's return number. However, in some instances, a callee may want to obtain contextual information that may not be known when a call connection is established. For example, a callee may want to receive voicemail messages with a "subject" in which the caller describes the topic of the voicemail message. If voicemail messages include a subject, then a callee may be able to easily prioritize and quickly process all received messages. In accordance with one embodiment, aspects of the present invention obtain contextual information from a caller based on the configuration of the callee's voicemail account. As a result, when a callee accesses a voicemail account, contextual information may be provided.

Figure 13:
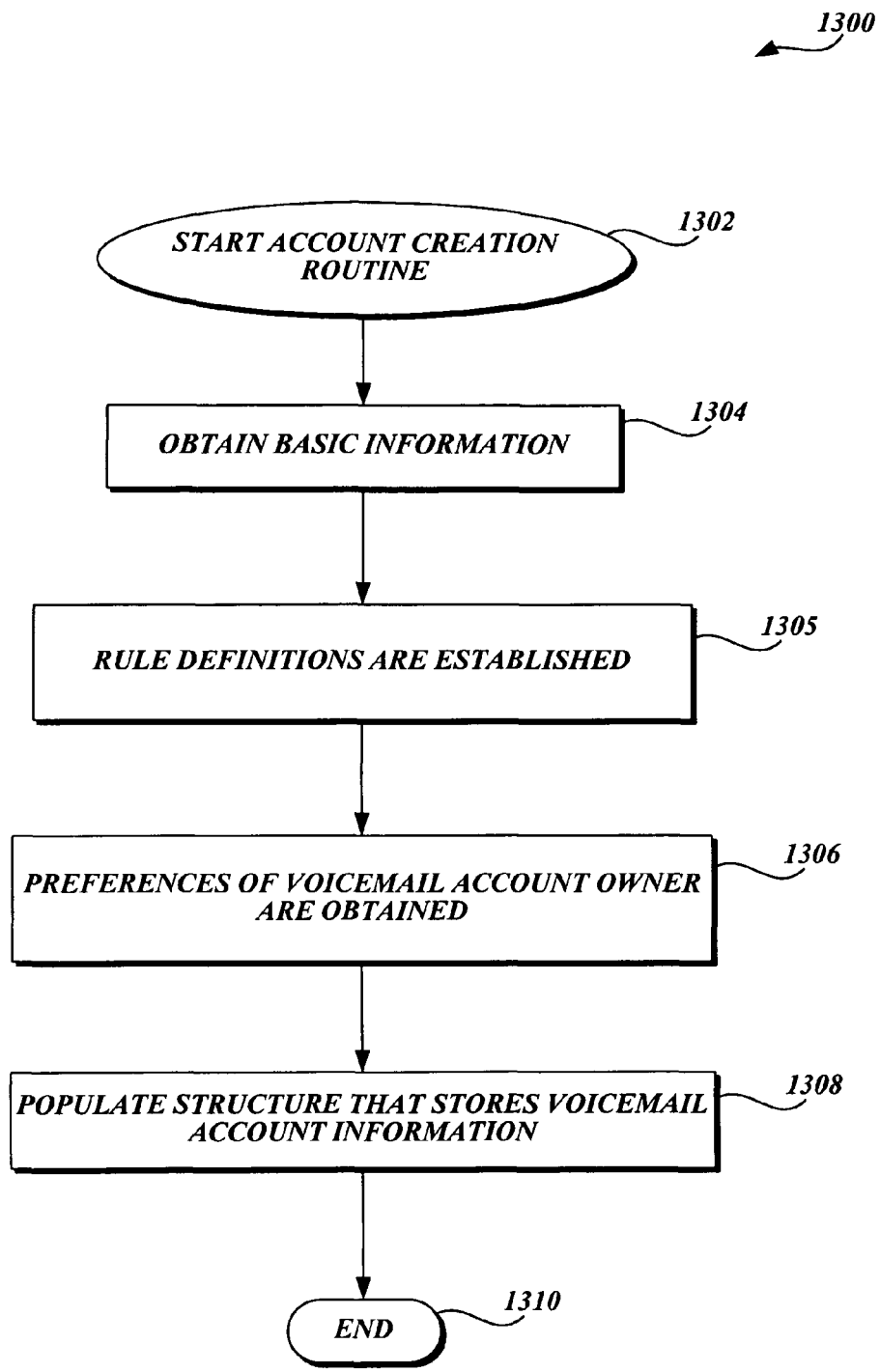
FIG. 13 is a flow diagram of an account creation routine for creating a configurable voicemail account in which contextual information may be obtained from a caller in accordance with an aspect of the present invention.

FIG. 13 is a flow diagram of an account creation routine 1300 for creating a configurable voicemail account in which contextual information may be obtained from a caller in accordance with an aspect of the present invention. In one embodiment, a service provider maintains a centralized computer system that stores rule definitions, user preferences, and other account information. To create an account, a wizard or similar input system may be employed to interact with a user. Moreover, a user may update the voicemail account, by activating the wizard and editing information included in the account.

The account creation routine 1300 begins at block 1302 and at block 1304 basic information about the owner of the voicemail account is obtained. The basic information may include, but is not limited to, the individual's name for which the account is being created, the unique VoIP identifier of the client with which the individual is associated, the date of creation for the account, the attributes of the device(s) associated with the client (VoIP client), such as equipment ID, rules as to how the voicemail account may be used/shared, etc. The basic information may be obtained automatically if the information was previously provided by the owner of the account. Alternatively, the basic information may be input by the account owner using a wizard or similar input system.

Upon identification of the basic information, at block 1305, a set of rule definitions used to determine whether a caller will be prompted for contextual information related to a voicemail message are established. As discussed above, during the establishment of a communication channel, or at some point thereafter, contextual information is automatically exchanged between clients engaged in the communication. In some instances, the contextual information exchanged is extensive and includes information that relates to VoIP clients, clients, conversation channel connections (e.g., call basics), conversation context (e.g., call context), and the like. In other instances, the contextual information exchanged is limited and may only include a caller's identity and return number. At block 1305, rule definitions that define the contextual information that will be made available to the callee are obtained. For example, a voicemail account owner may define rules to have a set of contextual information such as, but not limited to, the caller's identity/profile, organization, telephone number, subject of the voicemail message, etc., made available when a voicemail message is accessed. As described in further detail below with reference to FIG. 14, rule definitions will typically be referenced to determine whether additional contextual information will be obtained. For example, as described in further detail below, the rule definitions established, at block 1305, may cause a caller to be prompted for contextual information that is not automatically obtained when the communication channel is established. Moreover, aspects of the present invention may gather additional contextual information, if available, from third-party services based on the rule definitions established by a callee.

As illustrated in FIG. 13, at block 1306, preferences that relate to how contextual information is made available to the voicemail account owner are obtained. As mentioned previously, voicemail messages may be accessed in a number of different ways. For example, a voicemail account owner may use a POTS or wireless telephone to access an audio menu managed by a service provider in which menu items may be selected to navigate and listen to a voicemail message. In this example, the preferences obtained at block 1306 define how contextual information will be made available from the audio menu. A user may establish a preference to have certain contextual information automatically provided at the audio menu using an available Text-to-Speech ("TTS") engine.

Alternatively, a user may select preferences to have the contextual information made available from the audio menu only on demand.

By way of another example, in some voicemail systems, voicemail messages are forwarded to an account owner as attachments to e-mail messages. In this example, the user may input a set of preferences to identify contextual information that will be made available in the body or subject line of the e-mail message. Accordingly, a user may establish a preference to have a set of contextual information that includes the identity/profile of the caller, subject of the voicemail message, time of the call, and organization of the caller and the like, collected and made available in the body of an e-mail for every voicemail received. While specific examples of preferences that may be established by the account owner have been described above, those skilled in the art and others will recognize that other types of preferences may be established without departing from the scope of the claimed subject matter.

At block 1308, a data structure that stores information related to the rules and preferences of the voicemail account being created is populated. Among other things, the data structure contains entries for the basic information, rule definitions, and preferences input at blocks 1304-1306, described above. Since every user has different basic information, rule definitions, and preferences, each will have a unique data structure. As described in further detail below, when a voice message is received the data structure populated by the account creation routine 1300 is referenced to determine whether additional contextual information will be obtained either by prompting the caller or by accessing a third-party service. Moreover, the data structure may be referenced to determine how contextual information is made available to an account owner. Then the account creation routine 1300 proceeds to block 1310, where it terminates.

In accordance with one embodiment, the exchange of information between a caller and the voicemail system uses contextual data packets defined in accordance with an identified XML namespace. For example, the basic information may be obtained automatically, at block 1302, in this embodiment if the information sending client identifies at least one structured hierarchy from predefined structured hierarchies, such as an XML namespace. Moreover, classes and/or attributes to structured hierarchies may be extended beyond the set of predefined structured hierarchies if additional contextual information of the type that may be made available from a third-party service will be transmitted between clients.

Now with reference to FIG. 14, a flow diagram of a collection routine 1400 that obtains contextual information from a caller and/or third-party based on the configuration of a callee's voicemail account will be described. As a preliminary matter, a caller may request that a service provider initiate a communication channel connection with a callee prior to the collection routine 1400 being executed.

Figure 14:
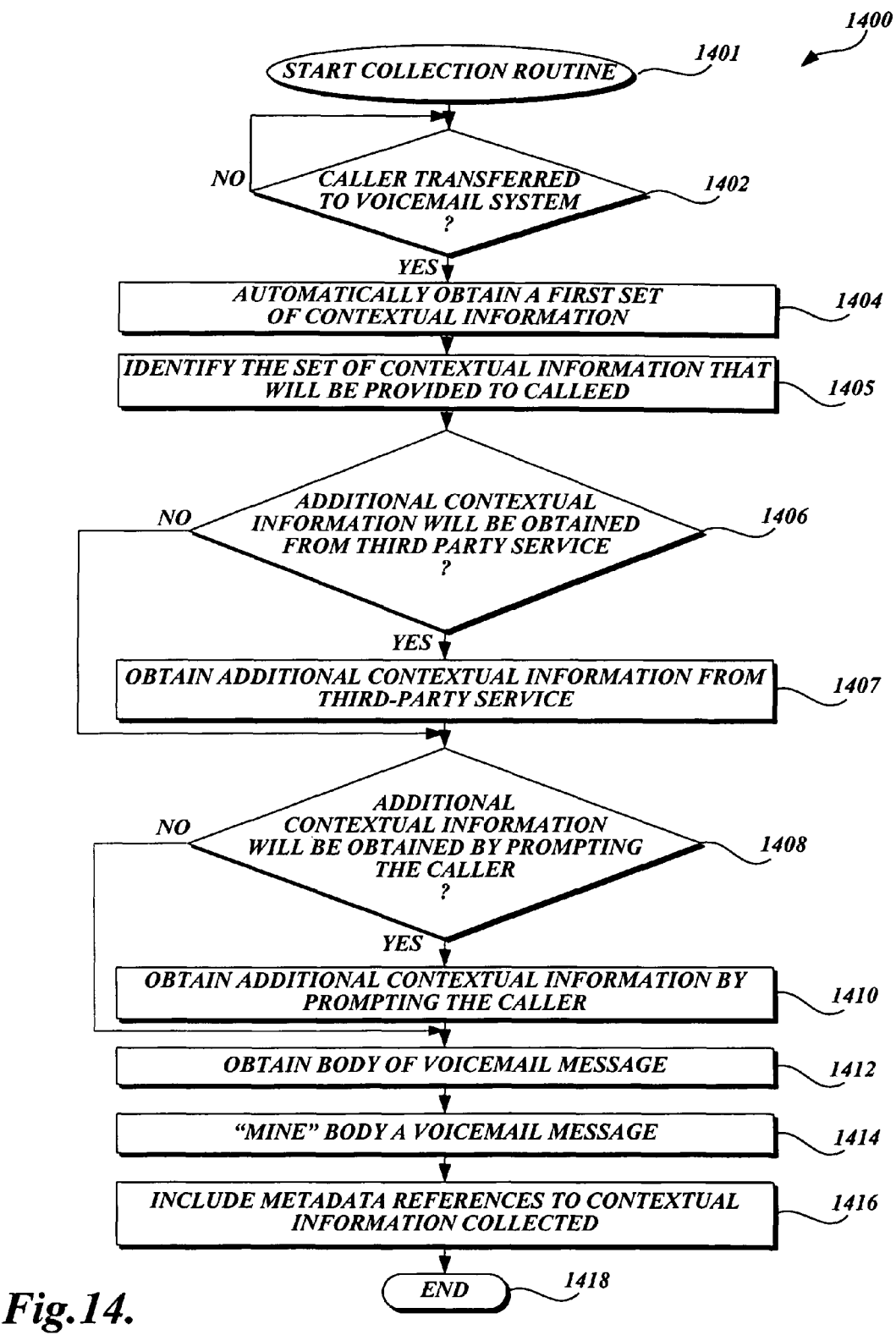
FIG. 14 is a flow diagram of a collection routine that may prompt a caller for contextual information in accordance with an embodiment of the present invention.

As illustrated in FIG. 14, the collection routine 1400 begins at block 1401 and at decision block 1402, the routine 1400 remains idle until a caller is transferred to a voicemail system. Typically, a caller is transferred to a voicemail system when an attempt to initiate a communication channel with a callee is unsuccessful. For example, if a callee does not answer a call or is otherwise unavailable, the caller may be automatically forwarded to a voicemail system managed by the service provider of the callee or by a third-party service. In other instances, a caller may use an application program to access a voicemail system by recording a voicemail message on a computing device and causing the message to be forwarded to the callee. However, those skilled in the art and others will recognize that the examples provided above are exemplary as a voicemail system may be accessed, at block 1402, using other techniques.

At block 1404, the service provider of the callee automatically obtains a first set of contextual information from the caller (if the callee is also a client of the service provider of the caller) or from a service provider of the callee (if the caller has a separate service provider). When a caller is transferred to a voicemail system, service providers will typically initiate a communication channel between clients associated with a caller and the voicemail system. In this regard, the service provider of the caller may obtain the caller's contextual information represented in accordance with identified structured hierarchies. Then, the service provider of the caller forwards the contextual information to a service provider associated with the callee when a communication channel with the voicemail system is established. Of course, one skilled in the art will recognize that the contextual information may be obtained using a different path of communication than described above.

At block 1405, the set of contextual information that will be made available to the callee is identified. As mentioned previously with reference to FIG. 13, rules are established for identifying the set of contextual information that will be made available to a callee with each voicemail message. In this regard, at block 1405, a lookup is performed in the data structure that stores the rule definitions established by the callee. As mentioned previously and by way of example only, a rule may be established by a callee that causes each caller to be prompted for a "subject" or other type of contextual information if the requested information was not automatically obtained, at block 1404. However, the same contextual information may not be obtained and made available to the callee with each voicemail message. Instead, as described in further detail below, rules established by the callee may cause different types of contextual information to be obtained depending on certain variables such as, but not limited to, the capabilities of the client being used to leave the voicemail message, the additional contextual information that is available from third-party services, preferences established by the callee, and the like. In any event, at block 1405, a data structure lookup is performed to identify the rule definitions established by the callee. Then, by performing a comparison of the rule definitions established by the callee to certain variables, the set of contextual information that will be made available to the callee is identified.

At decision block 1406, a determination is made regarding whether additional contextual information will be obtained from a third-party service. The contextual information that is obtained automatically (at block 1404) may indicate that the caller is not associated with any third-party service. Moreover, even if additional contextual information is available from a third-party service, all of the contextual information requested by the callee may have been previously obtained. In these instances, the result of the test performed at block 1406 is "no" and the collection routine 1400 proceeds to block 1408, described in further detail below.

Alternatively, additional contextual information that is requested by the callee may be available from a third-party service. For example, the caller may maintain a profile with a third-party social group that has permission to share the caller's social information (e.g. gender, marital status, picture, interests, mood, etc.) over a network service. By way of another example, a third-party service that uses global positioning systems ("GPS") or similar technologies may share a caller's location/presence information. However, those skilled in the art and will recognize that the examples of third-party services provided above should be construed as exemplary and not limiting. Instead, aspects of the present invention are highly configurable and may be configured to communicate with any existing, or yet to be developed, third-party service. In any event, if the callee requested additional contextual information not previously obtained that is available from a third-party service, the result of the test performed at block 1406 is "yes" and the collection routine 1400 proceeds to block 1407.

As illustrated in FIG. 14, at block 1407, additional contextual information requested by the callee is obtained from a third-party service. Similar to the description provided above, to facilitate communication between remote clients, the additional contextual information obtained from the third-party service may be defined in accordance with an identified XML namespace. Moreover, preferences established by the callee may cause different types of contextual information to be obtained that depend on one or more variables. For example, the time when the voicemail messages are received is one type of contextual information that may be obtained, at block 1402, or sometime thereafter. The callee may establish a rule definition to have different sets of contextual information obtained from the third-party service based on the time a voicemail message is received. In this regard and by way of example only, if a voicemail message is received between the hours of 7:00 p.m. to 11:00 p.m., the rule definition may dictate that a set of social information (e.g. gender, marital status, picture, interests, mood, etc.) is obtained. Conversely, if a voicemail message is received during "business hours," the rule definition may dictate that additional contextual information will not be obtained or that a different set of contextual information (title, organization, subject matter, etc) is obtained.

At decision block 1408, a determination is made regarding whether additional contextual information will be obtained by prompting the caller who was transferred to the voicemail system, at block 1402. Generally stated, two factors influence whether the caller will be prompted for additional contextual information. First, the capabilities of the client being used to leave the voicemail message may affect whether additional contextual information requested by a callee may be obtained. For example, a callee may request that the caller be prompted for contextual information that is in any one of a number of different formats including, but not limited to, audio, text, and/or image. However, a caller may employ a limited-feature client such as a POTS telephone to interact with the voicemail system. Obviously, even though a telephony environment supports communicating the contextual information in the desired format, the caller may not be capable of providing the requested contextual information in a required format. However, other potential callers may use an application program installed on a computing device to interact with a voicemail system. In this example, the caller is capable of providing the requested contextual information. Second, contextual information that is requested by the callee may be obtained automatically as a communication channel is established (at block 1404) or from a third-party service (at block 1407). In this regard, the contextual information that was previously obtained may satisfy all of the requests of the callee. If the caller is not able to provide the requested contextual information or all of the requested information was previously obtained, the caller will not be prompted for any additional contextual information and the collection routine 1400 proceeds to block 1412, described in further detail below. However, if the caller is capable of providing the requested contextual information that was not obtained previously, the collection routine 1400 proceeds to block 1410.

As illustrated in FIG. 14, at block 1410, the collection routine 1400 obtains additional contextual information by prompting the caller. In instances when a caller is using a client that is limited to sending or accepting audio-based data such as a POTS telephone, a callee may establish a preference to have one or more prompts communicated to a caller using Text-to-Speech ("TTS") technology. Alternatively, a callee may record the prompts that will be played to the caller. However, if a caller is capable of accepting text-based data, for example, if the callee is using a computing device to interact with the voicemail system, a text-based prompt may be presented to the caller. In any event, at block 1410, one or more prompts are presented and the additional contextual information requested by the callee is obtained. Then, at block 1412, the body of the voicemail message is received. In this regard, it should be well understood that a caller may communicate the body of the voicemail message, at block 1412, using any number of different clients or techniques.

At block 1414, any requested contextual information that was not previously obtained is "mined" or extracted from conversational data packets that are included in the body of the voicemail message. A voicemail account setting established by an account owner or by default may cause certain contextual information to be identified from the body of a voicemail message. For example, if a caller does not provide input for the "subject" of the voicemail message when prompted, a user may establish a preference to have the "subject" identified from the body of the voicemail message. In this regard, the identification of the "subject" may merely involve using a highly relevant section of the body of the voicemail message, such as the first five (5) seconds of audio, as the "subject." In other embodiments, the "mining" for contextual information performed at block 1414 may involve sophisticated filtering techniques. By way of example, these techniques may use a voice recognition engine to generate text from audio and identify statistically significant keywords from the text that, through empirical analysis, have been identified as having a high probability of being relevant to the callee.

At block 1416, metadata that references any additional contextual information obtained by the collection routine 1400 is included with the voicemail message. As mentioned previously, contextual information associated with a call conversation that is stored as a voicemail message is defined in metadata. At block 1416, any additional contextual information obtained by the collection routine 1400, either by accessing a third-party service, prompting the caller, and/or "mining" the body of the voicemail message, is added to the metadata associated with the voicemail message. As described in further detail below with reference to FIG. 15, the metadata identified by the collection routine 1400 may be used to identify the contextual information that will be made available to the callee. Then, the collection routine 1400 proceeds to block 1418, where it terminates.

Figure 15:
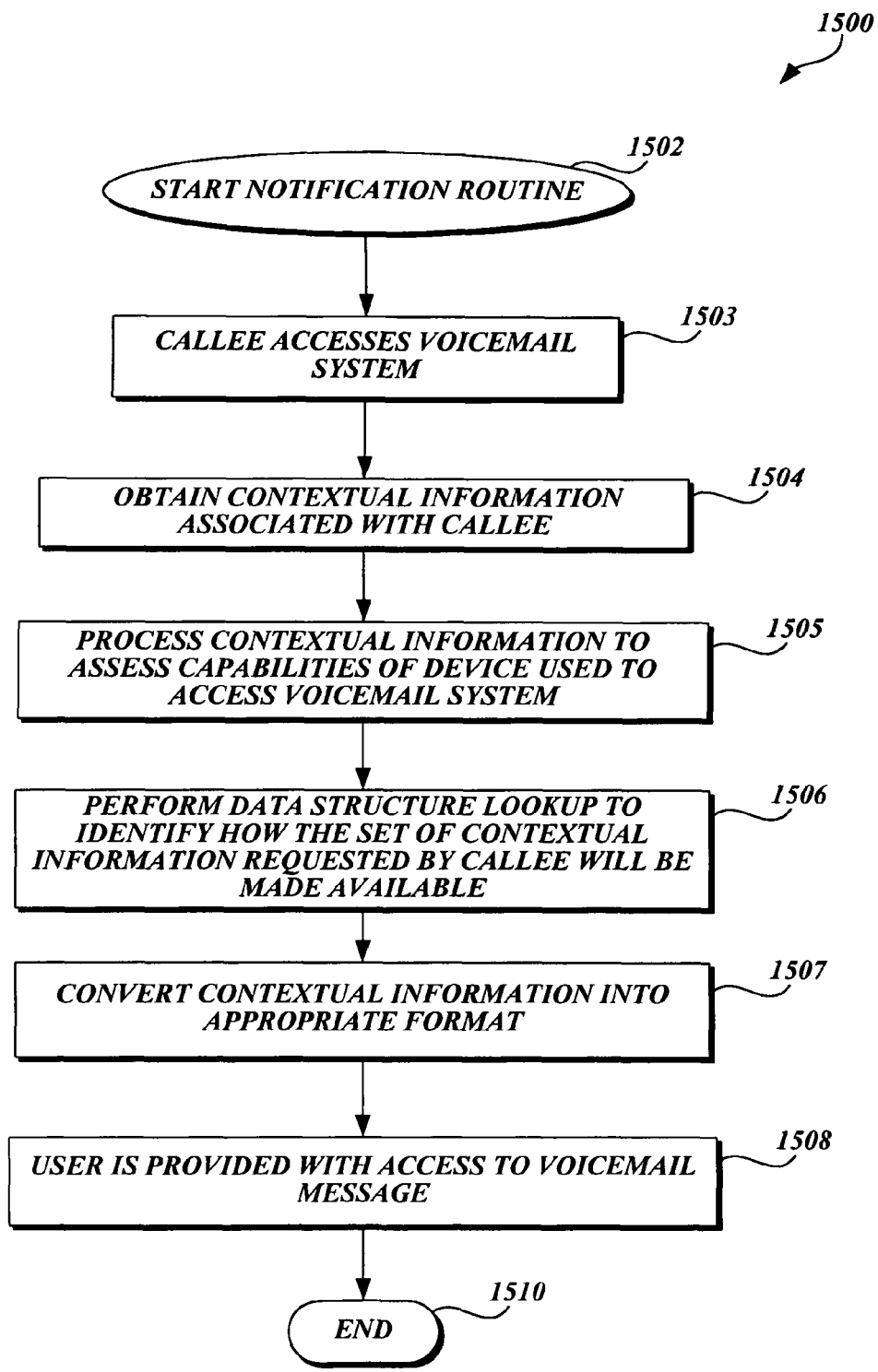
FIG. 15 is a flow diagram of a notification routine that provides a callee with access to contextual information that is related to a voicemail message in accordance with an embodiment of the present invention.

FIG. 15 is a flow diagram of a notification routine 1500 that makes contextual information available to a callee when a voicemail message is received. As illustrated in FIG. 15, the notification routine 1500 begins at block 1502 and at block 1503 a callee accesses a voicemail system that manages the callee's voicemail account. As mentioned previously, a callee may access a voicemail account from a computing device using an email application, voicemail application, etc. In this example, one or more voicemail messages may be "downloaded" from a centralized server maintained by the callee's service provider. Also, a callee may access voicemail messages from an audio menu using a limited feature client capable of sending or receiving audio data. In any event, at block 1503, a callee accesses a voicemail system where the callee may access any stored voicemail messages.

At block 1504, the notification routine 1500 obtains a set of contextual information that is associated with the callee who accessed the voicemail system at block 1503. When the voicemail system is accessed, a communication channel is established between clients associated with a callee and the callee's service provider. In this regard, the service provider may have the callee's contextual information stored or may receive the contextual information automatically in the form of structured hierarchies. Since techniques for obtaining contextual information when a voicemail system is accessed is described above, further description of the techniques will not be provided here.

Upon the contextual information associated with the callee being obtained, the notification routine 1500 processes the contextual information, at block 1505, to assess the capabilities of the client used to access the voicemail system. As mentioned previously, a callee may employ any number of different clients to access a voicemail system with each client having potentially different capabilities. For example, some feature-rich clients may be able to provide a callee with contextual information in a number of different formats including, but not limited to audio, text, and/or image. Other clients are more limited and, for example, may only be able to communicate contextual information to the callee in an audio format. As described in further detail below, aspects of the present invention make contextual information available to a callee in potentially many different formats. Since the capabilities of the client used to access the voicemail system may affect how and whether the contextual information will be made available, the capabilities of the client are identified.

At block 1506, a data structure lookup is performed to identify how the set of contextual information requested by the callee is made available. As mentioned previously with reference to FIG. 13, the owner of a voicemail account may establish rules and preferences regarding how different types of contextual information are made available. For example, if the callee accesses voicemail messages from an audio menu, a limited set of contextual information may be provided automatically or on demand depending on the configuration of the callee's voicemail account. Alternatively, if the voicemail system is accessed using an e-mail or voicemail application, a more extensive set of contextual information may be made available. In this regard, rules and preferences established by the user may dictate that the extensive set of contextual information is included in the body or subject line of an e-mail message with the voicemail as an attachment. While specific examples of rules and preferences are used to identify how contextual information will be made available to the callee, those skilled in the art will recognize that these examples are exemplary.

As illustrated in FIG. 15, at block 1507, the notification routine 1500 converts any contextual information that will be made available to the callee into the appropriate format. A caller may include contextual information with a voicemail message that is in any number of different formats. A callee may prefer or be limited to accessing the contextual information in a format that is different than the current format in which the contextual information was provided. For example, the collection routine 1400 described above with reference to FIG. 14 may prompt a caller for the "subject" of a voicemail message. Typically, the caller will respond to the prompt by verbally stating the subject, thereby providing contextual information that is in an audio format. The callee may have established preferences, identified by the notification routine 1500 at block 1506, to have contextual information made available to the callee in a text-based format. If the client used to access the voicemail system supports the requested format, the notification routine 1500 may convert contextual information at block 1507. For example, if the callee receives a voicemail message as an attachment to an e-mail, an audio formatted "subject" may be converted to text using a speech recognition engine. In other embodiments, contextual information provided by a caller in a text-based format may be converted to an audio-based format using a Text to Speech ("TTS") engine.

In some instances, contextual information included with a voicemail message is not capable of being converted, at block 1507, into a format that may be accessed by the callee. For example, an electronic image may be included with a voicemail message. If the callee accesses the voicemail system using a limited-feature client such as the POTS telephone, the image is not capable of being converted into a format that is accessible from the POTS telephone. In this example, the conversion performed at block 1507 may involve identifying a file name for the image and notifying the callee that the image is included with the voicemail message. More generally, those skilled in the art and others will recognize that other circumstances exist in which contextual information may not be made available to the callee. In these instances, the callee may be notified of the existence of the contextual information but may not be able to access the information due to the capabilities of the client being used.

As illustrated in FIG. 15, at block 1508, the callee is provided with access to the body of a voicemail message. As mentioned previously, a callee may obtain access to voicemail messages in any number of different ways including, but not limited to, (1) using an email or voicemail application program to "download" voicemail messages to a local computing device, or (2) interacting with a menu to select and listen to a voicemail message. Since these and other systems that provide a callee with access to a voicemail message are generally known in the art, they will not be described in detail here. However, it should be well understood that the notification routine 1500 is configured to provide contextual information when a callee is notified of the existence of a voicemail message. For example, if the callee obtains voicemail messages in e-mail attachments, the contextual information may be included in the body of the e-mail. Similarly, a voicemail application may include a Graphical User Interface ("GUI") with fields that present contextual information in a predefined format. Also, as mentioned previously, an audio menu used to access voicemail messages may provide contextual information to a callee automatically as a voicemail message is selected or on demand when the callee issues an appropriate command. Then the notification routine 1500 proceeds to block 1510, where it terminates.

While illustrative embodiments have been illustrated and described, it will be appreciated that various changes can be made therein without departing from the spirit and scope of the invention.

The embodiments of the invention in which an exclusive property or privilege is claimed are defined as follows:

1. In an Internet telephony environment that includes a voicemail system configured to receive a voicemail message, a method of obtaining contextual information from a caller that is requested by a callee, the method comprising:
   in response to a client associated with the caller being transferred to the voicemail system:
   accessing a voicemail account of the callee for accepting the voicemail message that that includes callee specified rules for obtaining contextual information from the caller;
   obtaining a first set of contextual information from the client associated with the caller may vary depending on the capabilities of the client;
   determining whether the voicemail account is configured to obtain additional contextual information; and
   when the voicemail account is configured to obtain additional contextual information, obtaining the additional contextual information requested by the callee, wherein obtaining the additional contextual information requested by the callee includes accessing a service that maintains the additional contextual information on behalf of the caller.

2. The method as recited in claim 1, further comprising including references to the additional contextual information obtained from the caller in the metadata of the voicemail message.

3. The method as recited in claim 1, further comprising:
   obtaining the body of the voicemail message;
   extracting contextual information from the body of the voicemail message; and
   wherein extracting the contextual information for the body of voicemail message includes identifying statistically significant keywords in the body of the voicemail message using a voice recognition engine to convert audio to text.

4. The method as recited in claim 1, wherein the contextual information obtained from the caller includes the subject of the voicemail message.

5. The method as recited in claim 1, wherein determining whether the voicemail account is configured to obtain additional contextual information requested by the callee, includes:
   comparing the first set of contextual information obtained automatically with the contextual information requested by the callee,
   when the callee requests contextual information that is not available from a third-party service or included in the first set of contextual information, determining that additional contextual information will be obtained from the caller.

6. The method as recited in claim 1, wherein determining whether the voicemail account is configured to obtain additional contextual information requested by the callee, includes:
   identifying the data formats that the client associated with the caller is capable of capturing; and
   if the client associated with the caller is not capable of capturing contextual information in a required data format, determining that the caller will not be prompted for the additional contextual information.

7. The method as recited in claim 1, wherein obtaining the additional contextual information requested by the callee includes prompting the caller for the additional contextual information.

8. The method as recited in claim 7, wherein the additional contextual information obtained requested by the callee may be in a text, audio, or image-based data format.

9. A computer-readable memory containing computer-readable instructions which, when executed, performs a method of providing contextual information to a callee, when the callee accesses a voicemail account, the method comprising:
   identifying the capabilities of the client associated with the callee that accesses the voicemail account that is configured to attempt to obtain contextual information that may vary based on the capabilities of the client from a caller based on callee specified rules;

identifying contextual information that will be made available to the callee; and providing the contextual information to the callee.

10. The computer-readable memory as recited in claim 9, wherein identifying the capabilities of the client associated with the callee that accesses the voicemail account includes obtaining contextual information over a communication channel.

11. The computer-readable memory as recited in claim 9, wherein identifying contextual information that will be made available to the callee with a voicemail message includes performing a lookup in a data structure that stores rules and preferences established by the callee.

12. The computer-readable memory as recited in claim 9, wherein providing the user with access to the contextual information includes, converting contextual information into a format that is appropriate for the client associated with the callee that accesses the voicemail account.

13. The computer-readable memory as recited in claim 12, wherein converting contextual information into a format that is appropriate for the client associated with the callee that accesses the voicemail account includes, using a speech-to-text engine to convert contextual information from a text to audio format if contextual information in a text format will be provided to the callee in an audio format.

14. The computer-readable memory as recited in claim 12, wherein converting contextual information into a format that is appropriate for the client associated with the callee that accesses the voicemail account includes, using a voice recognition engine to convert contextual information from an audio to text format if contextual information in a audio format will be provided to the callee in a text format.

15. The computer-readable memory as recited in claim 9, wherein providing the callee with access to the contextual information includes adding contextual information obtained by prompting the caller to the body of an e-mail message if an e mail application is used to obtain the voicemail message.

16. A computer-readable memory having computer executable components for obtaining contextual information related to a voicemail message from a caller and providing the contextual information to the callee, comprising:

a collection component for obtaining contextual information from a caller that may vary depending on the capabilities of the client associated with the caller based on callee specified rules when a voicemail message is received;

a notification component that provides the contextual information obtained from the caller to a callee when the voicemail message is accessed; and an account creation component for generating a voicemail account that store rules and preferences for obtaining contextual information with a voicemail message.

17. The computer-readable memory as recited in claim 16, further comprising an extraction component for mining contextual information from the body of a voicemail message.

18. The computer-readable memory as recited in claim 16, wherein the collection component is further configured to:

automatically obtain contextual information from the caller; and determine whether additional contextual information is requested by the callee.

\* \* \* \* \*